United States Patent
Chen et al.

(10) Patent No.: US 6,195,694 B1
(45) Date of Patent: Feb. 27, 2001

(54) SERVER FOR RECONFIGURING CONTROL OF A SUBSET OF DEVICES ON ONE OR MORE KIOSKS

(75) Inventors: Shuang Chen, Somers; Tetsunosuke Fujisaki, Armonk, both of NY (US); Makoto Kobayashi, Machida (JP); Mitsuru Ohshima, Yamato (JP); Yoichi Yoshida, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/974,214

(22) Filed: Nov. 19, 1997

Related U.S. Application Data

(60) Provisional application No. 60/040,414, filed on Mar. 13, 1997.

(51) Int. Cl.[7] ................................................. G06F 15/177
(52) U.S. Cl. .................... 709/220; 709/203; 709/204; 709/219; 709/221
(58) Field of Search ............................. 709/200–204, 709/217–221, 227–229, 223–225, 245–246; 707/100–104, 501, 513; 713/200–201; 235/380

(56) References Cited

U.S. PATENT DOCUMENTS

| | | | |
|---|---|---|---|
| 5,587,740 | 12/1996 | Brennan | 348/373 |
| 5,602,905 | 2/1997 | Mettke | 379/93.22 |
| 5,708,782 | 1/1998 | Larson et al. | 705/14 |
| 5,710,886 | 1/1998 | Christensen et al. | 705/14 |
| 5,761,071 | 6/1998 | Bernstein et al | 700/237 |
| 5,768,142 | 6/1998 | Jacobs | 700/231 |
| 5,774,663 | 6/1998 | Randle et al. | 709/204 |
| 5,781,909 | * 7/1998 | Logan et al. | 709/200 |
| 5,791,991 | 8/1998 | Small | 463/41 |
| 5,802,299 | 9/1998 | Logan et al | 709/218 |
| 5,812,765 | 9/1998 | Curtis | 709/200 |
| 5,815,657 | 9/1998 | Williams et al. | 713/200 |
| 5,818,446 | 10/1998 | Bertram et al. | 345/334 |
| 5,826,267 | * 10/1998 | McMillan | 709/225 |
| 5,894,512 | * 4/1999 | Zenner | 379/265 |
| 5,898,835 | * 4/1999 | Truong | 709/217 |
| 5,899,982 | 5/1999 | Randle | 705/35 |
| 5,901,287 | * 5/1999 | Bull et al. | 709/218 |
| 5,905,248 | 5/1999 | Russell et al. | 709/218 |
| 5,909,545 | 6/1999 | Frese, II et al. | 709/208 |
| 5,949,411 | * 9/1999 | Doerr et al. | 709/219 |

* cited by examiner

*Primary Examiner*—Ahmad F. Matar
*Assistant Examiner*—Bharat Barot
(74) *Attorney, Agent, or Firm*—Louis J. Percello

(57) ABSTRACT

A server system that is connected to one or more networks, e.g., the Internet, corporate or government intranets, extranets, etc. The server has one or more application files or configuration sets that the server serves to from one or more kiosks on the network. The configuration sets are application specific. (An application is a use for which the kiosks are configured or reconfigured.) One or more of the files in the configuration sets include one or more embedded (control) programs that are used to control the local APIs of one or more of the devices on the kiosk. In this way, the devices are controlled to configure the kiosk to perform the application.

23 Claims, 14 Drawing Sheets

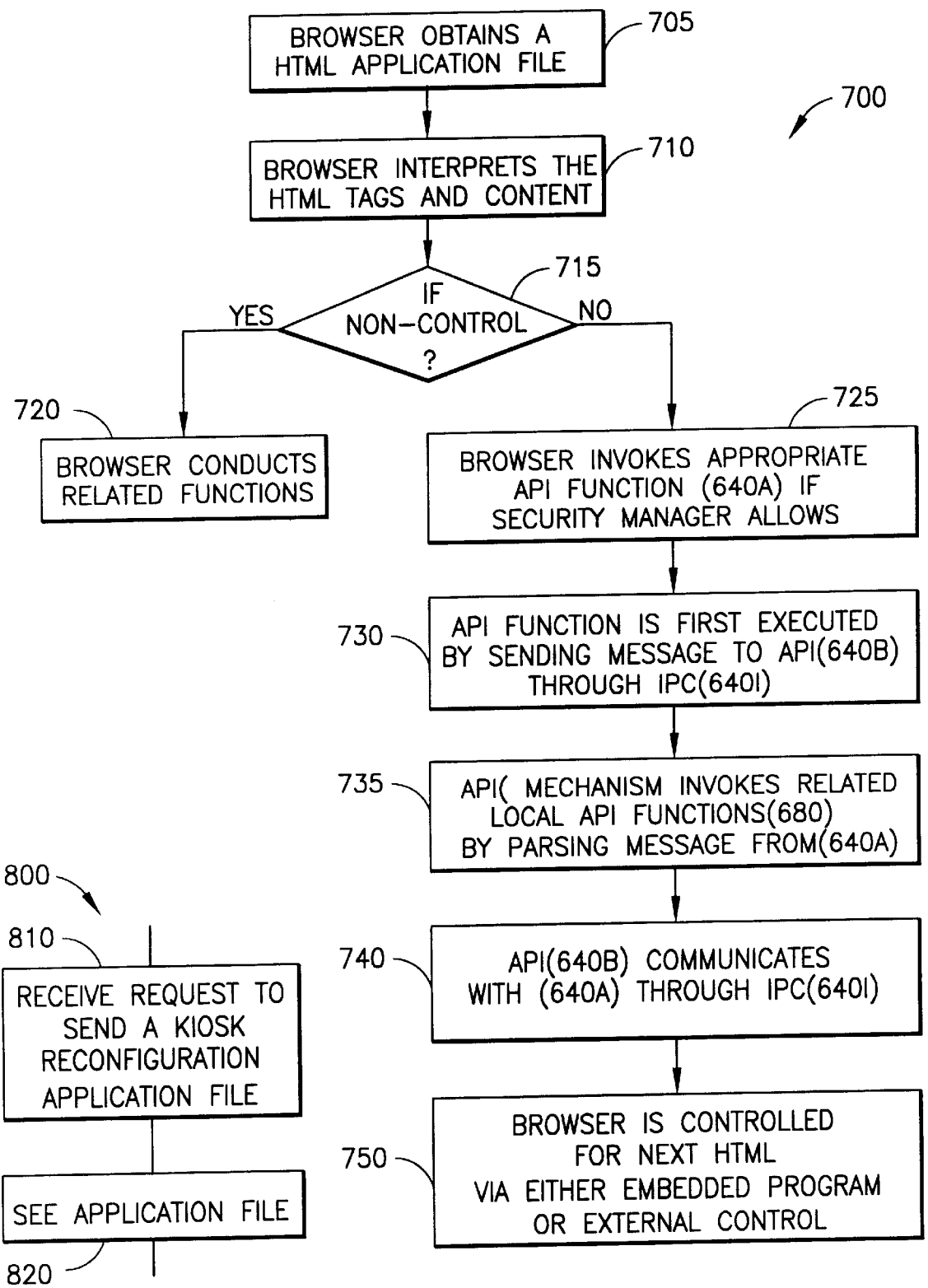

SERVER FOR RECONFIGURING CONTROL OF A SUBSET OF DEVICES ON ONE OR MORE KIOSKS

The present application claims priority to co-pending U.S. provisional application No. 60/040,414 filed on Mar. 13, 1997.

FIELD OF THE INVENTION

This invention relates to the field of servers that are connected to a computer network for the purpose of configuring configurable kiosks connected to the computer network.

BACKGROUND OF THE INVENTION

Typically a kiosk is a machine placed in a location for general, e.g. public, access of users or clients so that a service provider can provide a service to these users/clients. Typically, these services are "self-services" that are conducted by the client without the service provider providing an agent to offer specific help to the client. Therefore, the services tend to be repetitive, simple, and specific tasks like: 1. getting information, and/or 2. completing certain simple transactions (e.g., buying tickets, getting cash, see the department store's floor map, etc.).

Tasks to be conducted need to be pre-programmed and predetermined and have to be self service. Therefore the kiosk designs are inflexible and offer no help customized to a specific user.

Generally these transactions involve the use of some device(s), e.g., one or more monitors, a card reader, a ticket printer, a laser printer, a cash dispenser, etc. These devices are typically dedicated to the predefined tasks inflexibly designed in the kiosk and therefore the devices have no other usage.

Advantages of kiosks are that they are convenient and reliable. Kiosks do not require full time human operators to perform their tasks and therefore, save operating costs and increase productivity.

Some kiosks in the prior art are connected by a network, e.g., bank ATM machines, airline ticket machines, etc. There are also stand alone kiosks such as information kiosk in shopping malls.

The prior art includes kiosks with video conferencing for banking applications to try to create a connection between the bank agent and the user/client. This is done by simply adding a video conferencing system to a traditional type of kiosk.

The prior art also has combined kiosks with the internet. This kiosk has a browser which displays the HTML pages on the screen of the kiosk. The screen displayed on the kiosk is controlled by the hyperlinks selected by the user. These kiosks are suitable for information access where the client/user can browse through the information provided by selecting "soft" buttons that invoke a hyperlink. These kiosks can also be used for certain personal communications like e-mail. In these systems, the screens are usually specially designed to present a user interface (e.g., having navigation buttons, etc.) and the kiosk further acts as a filter to limit the URLs the client can traverse so that only HTML pages (URLs) defined by the kiosk builder are accessible.

STATEMENT OF PROBLEMS WITH THE PRIOR ART

Most prior art kiosks are inflexible. They can not be changed or reconfigured easily, cheaply and quickly because their programming is typically specifically designed, developed (usually in a high-level computer programming language such as C or C++), and installed on the kiosk for a specific application. Any change would require re-coding, re-compiling, re-installing, and re-testing the program on the kiosk. This typically has to be done by the kiosk manufacturer. Changes to existing kiosks are difficult, especially if there are a lot of kiosks in the field that need to be updated.

Prior art kiosks fail to provide effective "face-to-face" service based applications, i.e., where an agent is needed to consult and/or guide the user or client in order to complete the service or transaction. An effective "face-to-face" environment for the customer service requires not only video/audio, but also synchronized screen sharing (e.g., the user/client sees the data while the agent enters the data) and remote device control (e.g., the agent can print a receipt for the kiosk user/client). The prior art does not provide synchronized screen sharing or remote device control of kiosks.

While some prior art offers a user help from an agent over a telephone, the agent generally can not view the kiosk screen directly. Therefore, the agent must rely on the user's description of any problems with the kiosk. The agent can not view the kiosk screen directly to assess problems. Further, the agent can not change the kiosk program/function from a remote location to fix any kiosk problem. Note that some kiosks in banking applications provide banks agents a view of the kiosk screen content. But this content is displayed by a separate application that is running on the agent's work station, not the application causing the screen content to be displayed on the kiosk.

Some prior art provides video conferencing as a function of the kiosk. However, while video conferencing provides the client with a audio/video connection to other parties, this architecture has not been successful in the market because of the lack of coherent integration between the audio/video communication and the content of the kiosk screen. While the client has a problem with one of the entries on kiosks screen, the agent may not have the same information on the agent screen as the client has on the kiosk, e.g., the kiosk has an ambiguous or erroneous value in a field on the screen but the agent will not see this erroneous value during the video conference. Further, the agent can not point to locations on the client's screen nor can the agent take control of the client's screen. In addition, the agent can not provide the client general information through the kiosk that the kiosk is not already preprogrammed to provide. As another example, if the customer needs information that is not available in the kiosk design, the agent can only provide the information by voice or camera video but can not provide any information on the client's kiosk screen or through other kiosk devices.

Some prior art discloses simple internet/browser-based kiosks that can only conduct a limited and specific application, i.e., limited information browsing. These kiosks can not provide an effective customer service environment with flexible applications because of its lack of kiosk control capability and collaboration between the client and the human agent.

OBJECTS OF THE INVENTION

An object of this invention is a network server system and method that supports a flexible, reconfigurable, and collaborative kiosk architecture.

An object of this invention is a server system and method that provides the public ubiquitous, configurable, and directly accessible network interfaces for a variety of applications.

An object of this invention is a server system and method that supports a flexible, reconfigurable, and collaborative kiosk that supports "face-to-face" agent to client service and/or transactions.

An object of this invention is a network server system and method that configures kiosks and kiosk devices on the network(s) in different ways for different applications.

An object of this invention is a server system and method that can deliver very large number of stored or created applications to reconfigure remote kiosks.

SUMMARY OF THE INVENTION

The present invention is a server system and method that is connected to one or more networks, e.g., the internet corporate or government intranets, etc. The server(s) serve application files (also called configuration sets) over the network(s) to one or more remote kiosks in order to configure and reconfigure the kiosks to perform various applications that are defined by the application files.

In some preferred embodiments, part of the application includes a web page sharing function that allows an agent and client to collaborate over the network(s) through the kiosk and server.

BRIEF DESCRIPTION OF THE DRAWINGS

The foregoing and other objects, aspects and advantages will be better understood from the following detailed description of preferred embodiments of the invention with reference to the drawings that are include the following:

FIG. 7 is a flow chart showing the steps performed in executing one application file with API control functions.

FIG. 8 is a flow chart showing the steps performed in a typical server.

DETAILED DESCRIPTION OF THE INVENTION

FIGS. 1–10 below also describe the embodiments and function of configurable kiosks which work with the server of this invention. These kiosks are further described and claimed in U.S. patent application Ser. No. 08/974,216, entitled "Content Configureable and Collaborative Kiosk", invented by the same inventors as this application and filed on the same day as this application now abandoned. This Application is incorporated by reference in its entirety.

Figure 1:
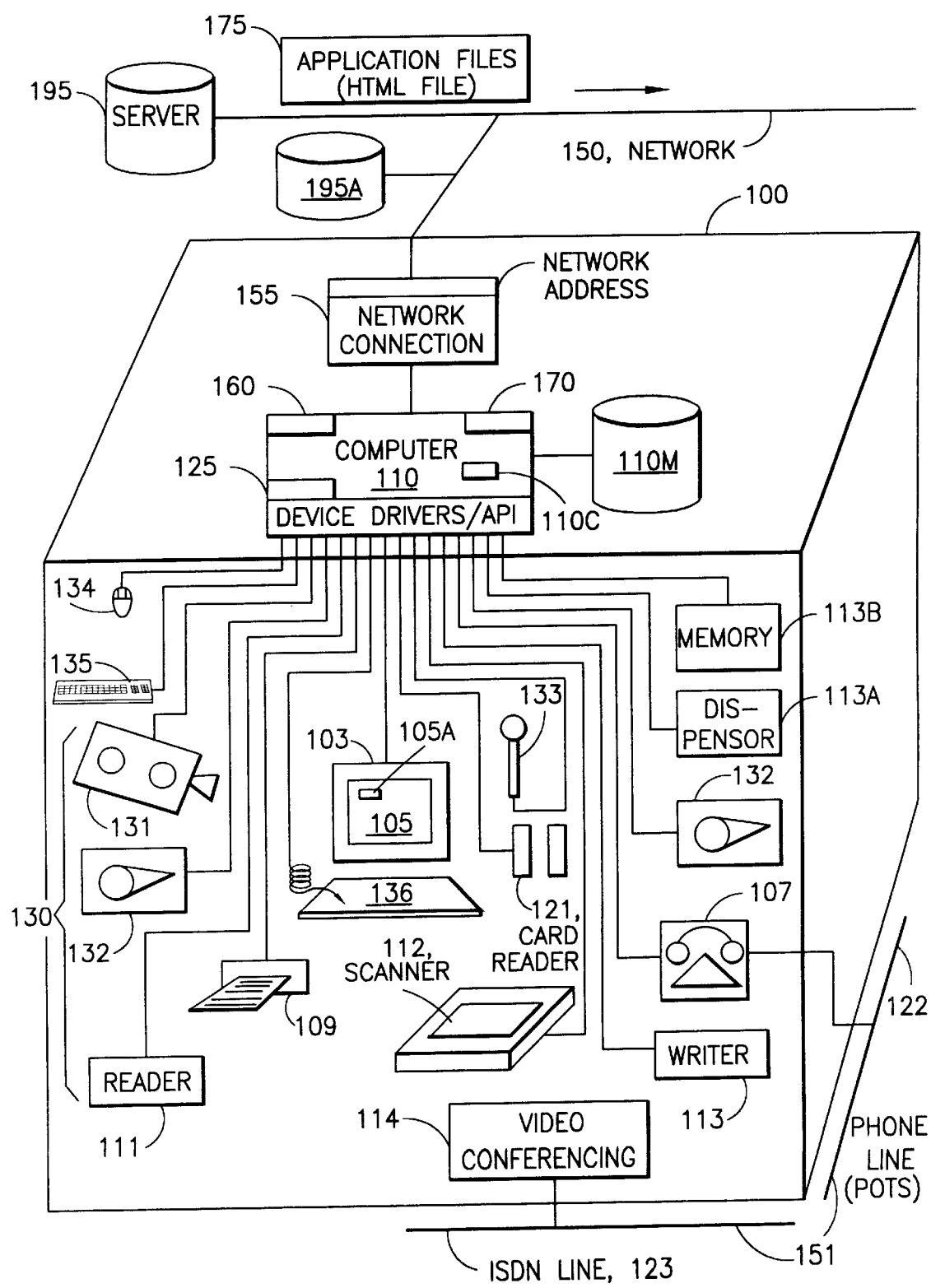
FIG. 1 is a block diagram of one preferred embodiment of a kiosk.

Refer to FIG. 1 which is a block diagram of one preferred embodiment of a kiosk 100 that comprises the present invention. In this embodiment, the kiosk 100 comprises a computer 110, (e.g. an IBM personal computer like a PC350 or a PC750), which has an appropriate known network interface 155. The network 150 can be any know local area network (LAN) or wide area network (WAN). In a preferred embodiment, the network 150 is the Internet. However, other general networks 150 are envisioned, including: intranetworks like corporate networks, government networks, education networks, extranetworks between corporations, and networks used by one or more retailers which can be implemented by telephone networks, cable networks, ISDN networks, etc. The computer 110 has one or more input and/or output devices (below) 130 that are mounted as part of the kiosk 100. Typically the computer 110 has one or more main memories, one or more storage memories (like hard disk drives, CDROMS, etc.) 110M and one or more central processing units (CPU) 110C that are well known. Further, the computer 110 has an optional hardware keyboard 135 and mouse 134, e.g., for maintenance purposes. Using the invention, a user accesses these various (peripheral 130) input and/or output devices (collectively numbered as 130) to transfer information through the computer 110 and network 150 to and/or from other clients and/or servers 195 connected to the network 150. Examples of these input/output devices 130 include: a touch sensitive terminal 103 with a screen 105; a printer 109; any known generic information reader 111 (e.g. a card reader 121 for reading like a magnetic card, credit card, or smart card), a scanner (e.g. a laser scanner) 112, any known generic information writer 113 (a printer, a ticket printer, a media printer—like a diskette disk drive, a statement printer, or a receipt printer), a dispenser (e.g. for dispensing stickers or computer discs), or any other device 130 that provides a user with information on a tangible media 113A. Other input/output devices 130 include any one or more of the following: a cash dispenser, a scanner, a deposer, a pen input 136, a card issuer, a ticket issuer, a CRT, a key board, a touch sensitive screen, a program controllable camera, one or more human sensors (e.g. infra red), one or more lights, a CD ROM player, an audio input/output device (e.g. a microphone 133, speaker 132, or a telephone set 107) and a memory 113B. The kiosk 100 can be provided with known, alternative, and separate communication devices such as a telephone 107 or a video conferencing system 114, for example a PictureTel PCS-100 Desktop ISDN Video Conferencing System. (PictureTel is a trademark of the Picture-Tel corporation.) The video conferencing system can further comprises a camera(s) 131, a speaker(s) 132, a microphone (s) 133, and/or one or more ISDN connections or separate network connections through the appropriate network interfaces 155. Connections can be made to other networks 151, e.g. a POTS phone network 122 through the telephone 107, speaker 132, microphone 133, and ISDN line 123. Other peripheral devices 130 can also connect independently to networks (150, 151) using known interfaces. These peripheral devices 130 are well known but are used in a novel way in this kiosk application.

The computer CPU 110C also executes software programs including control processes and libraries 125 and in some preferred embodiments one or more collaboration processes 170. The control processes 125 have two parts: one or more embedded control functions/programs 620 and one or more control mechanisms 640. (See FIGS. 5, 6–6D, below.) The embedded control programs/functions 620 are content specific processes (e.g. for banking, car rental, merchandise purchasing, etc.) that use the non content specific control mechanisms 640 to control local application program interfaces 680 (APIs) associated with the respective input/output devices (or subsets thereof) 130. Therefore, the input/output device 130 are controlled in a way specific to the content of the application. In alternative embodiments, the control mechanisms can be dynamically loaded into the computer 110 from the network 150.

The collaboration processes 170 includes the APIs and other programs that execute functions that establish a collaboration session from the kiosk 100. This collaboration process is described in U.S. patent application Ser. No. 08/722,287, entitled "Internet Web Page Sharing", to Fin et al. filed on Sep. 27, 1996 which is herein incorporated by reference in its entirety. The computer further executes programs necessary to interact with the network 150 including a web browser program 160, e.g. a Netscape Navigator. (Netscape Navigator is a trademark of the Netscape Corporation.)

Figure 2:
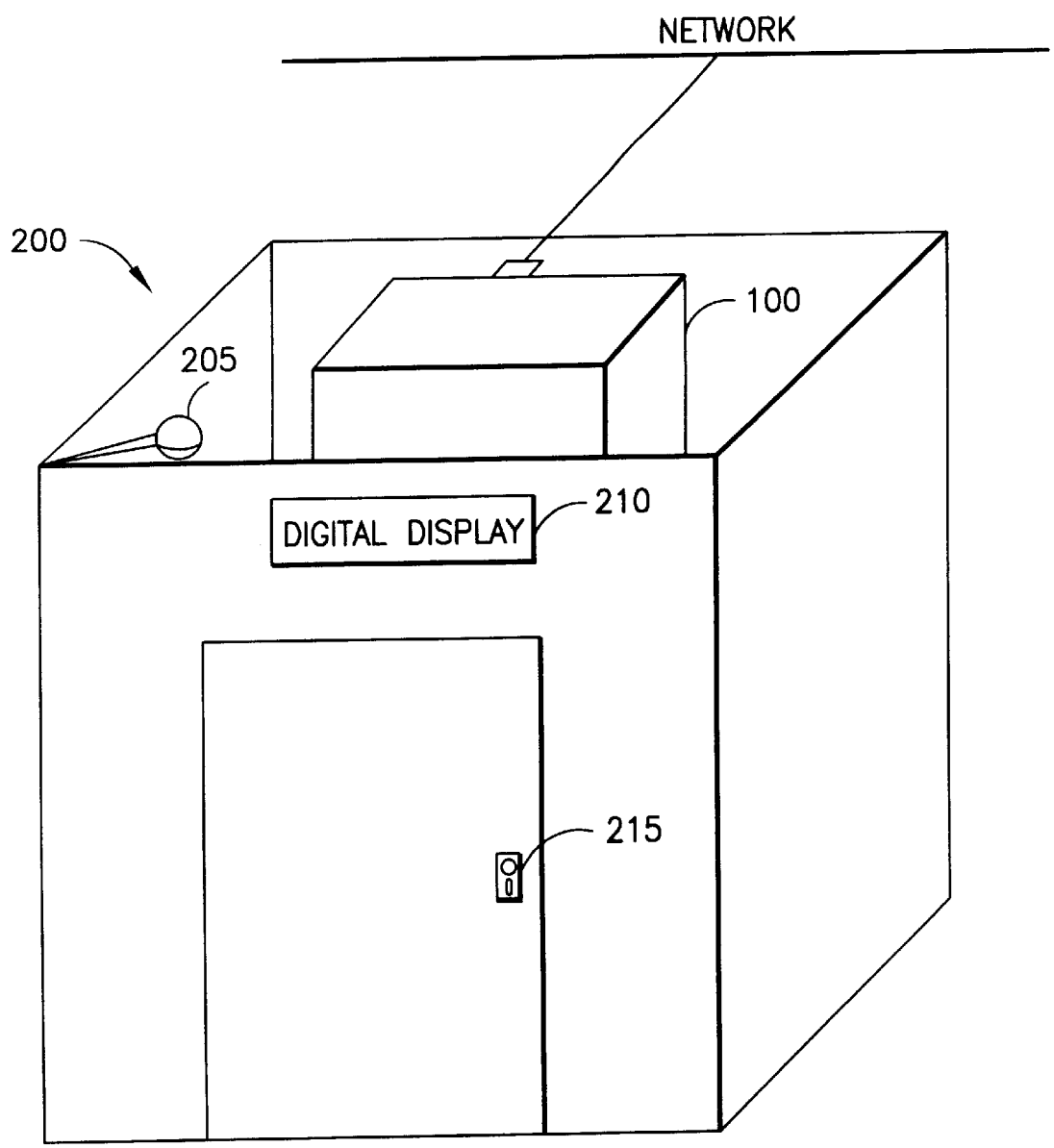
FIG. 2 is a block diagram of an alternative preferred embodiment of a kiosk.

FIG. 2 is a block diagram of an alternative embodiment of the invention that shows the kiosk 100 in an enclosed space or partially enclosed space 200. The enclosed space 200 can be any type of space, e.g. a room, a cubicle, or any other private or semi-private area in which the kiosk 100 resides with one or more user. In this embodiment, the computer 110 is connected to and controls one or more known environmental peripherals 130 that the computer 110 controls to create an environment for the user in the (partially) enclosed space 200. For example, the environmental peripheral might include lighting 205 of the (partially) enclosed space, displays 210 in the (partially) enclosed space 200 that convey addition information (e.g. sales information) and/or environmental factors (e.g. a variable display of scenery or a virtual world), and/or security access 215 to and/or from the (partially) enclosed space 200. In addition, the (partially) enclosed space can have other environmental peripherals 130 similar to those peripherals 130 described above, e.g. sound, video conferencing, etc. Examples of a virtual worlds are well known.

In a preferred embodiment of systems 100 and 200, a user selects (using a selection function) an application, e.g. banking, for which the kiosk is to be configured and the browser 160 interacts with one or more web servers 195 on the internet (general network) 150 to fetch one or more configuration sets 175. Optionally data communication begins between the server 195 and the browser 160 in the kiosk (100, 200). The application files 175 are then executed, file by file, by the browser 160 to: 1. optionally invoke driver programs (local APIs 680) that control one or more of the input/output devices (e.g. touch sensitive terminal 103 or display) 130 that are used with the respective application; 2. optionally cause a series of input/output device 130 actions to occur, e.g. as series of web pages to be displayed on the terminal/display 103; 3. optionally communicate user input from the input devices 130 to the server 195; and 4. optional select further application files 175 for further execution by the browser 160 dependent on the user input. Therefore, by using this invention, the user can use a first selection function to select a first application (and its associated application files 175 on the server 195) that reconfigures the kiosk to a first specific selected application.

By selecting a second application, the kiosk is again reconfigured for the second application and so forth. Selection functions for any later configuration can be provided to the user in a prior configuration.

An application is any use for which the kiosk is configured. For example, applications include uses (configurations) in the following fields: financial, business, information (news, advertising), communications (electronic mail, web access, video conferencing), retail, marketing, services (e.g., government programs). An application owner is any person, organization, or business that would configure the kiosk to provide the application. For example, a bank or mutual fund would configure the kiosk with one or more financial applications. Examples of these financial applications include providing the user with financial information, opening an account, dispensing cash, paying bills, applying for loans, making deposits, and obtaining assistance from the agent. An example of a service owner would be a car rental company that would configure the kiosk to provide a car rental/lease, etc.

In alternative preferred embodiments, the kiosk (100, 200) is reconfigured not by the user, but by the server 195. For example, the kiosk can be located in a public place, like a shopping mall. The browser can be made to initially or periodically fetch (or the server can be made to "push") the configuration set (application files) 175 to the kiosk 100 from one or more servers 195 or from a default or proxy server 195A located on the network 150. Therefore, a system designer can control the configuration of the kiosk from the remote location of the server 195. As an example, the kiosk in the mall can initially be configured to display a map of the mall, play background music, make announcements or provide the weather, or other general information like news or stock quotes. The configuration set 175 can also direct one or more of the input/output devices 130 to have or be a selection function 105A, e.g. a touch screen, an icon, a hypertext link, a soft button on the graphical user interface, a hard-wired button, a remote sensor (like a radio frequency identification tag), or a voice activated message for the video conferencing system. The selection function 105A is a function that allows the user to make a selection that causes the kiosk to be reconfigured to a user application. These selection functions 105A allow the user to reconfigure the kiosk 100/200 and/or access the other information the server 195 causes the kiosk to provide.

The selection functions 105A, and/or other information displayed, also can be a source of revenue for the owner/operator of the kiosk. For example, notices provided by the kiosk can be advertisements made for a fee. Application providers (e.g. banks, mutual funds, mortgage companies, lenders, brokers (stock, real estate), rental businesses (cars, equipment), services providers, and retailers) would pay a fee to have a selection function 105A on the kiosk 100/200 that the user would select to configure the kiosk to their application. The amount of the fee might be based on: the location of the kiosk, the position/location of the selection function/information on the kiosk (e.g. graphical user interface), the size of the selection function 105A, the time and duration that the selection function 105A/information is provided by the kiosk, etc. The selection functions 105A/information can be changed at different times or displayed periodically in order to target a different class of customers/clients. For instance, a kiosk in Grand Central Station might have commuter information displayed at rush hour and would be reconfigured to have selection functions 105A for restaurant reservations just before lunch time.

The kiosk 100/200 can be reconfigured to be user specific by the application provider through the server 195. For example, a travel agency might have a user profile for Mr. Smith. Mr. Smith would select a selection function 105A on a kiosk 100/200 at a public location or at his place of employment. Once the kiosk is reconfigured for the application of the travel agent, the kiosk (as directed by one of the application files 175) might request personal information from Mr. Smith, e.g. by entering in a PIN code or swiping a credit card using one of the input/output devices 130. Mr. Smith's personal information is then passed to the server 195 by the kiosk 100/200 and a profile on Mr. Smith is accessed. Using information in the profile, one or more of the application files 175 sent by the server 195 to reconfigure the kiosk specifically for Mr. Smith. For example, only vacation packages to Central America will be provided on the kiosk. In alternative embodiments, one or more of the application files 175 can allow the user to organize the GUI (300 below.)

In other preferred configurations of the kiosk 100/200, a collaboration session is set up between one or more kiosk users and one or more agents of the application provider. The collaboration is set up by the collaboration process 170 that is resident on the kiosk or provided as an application file 175 by the server 195. See the U.S. patent application Ser. No. 08/772,287 entitled "Internet Web Page Sharing", to Fin et al. incorporated above.

In an additional preferred configuration of the kiosk (100, 200), the server 195 provides the kiosk with application files 175 that are used to monitor or maintain the kiosk. For example, one or more of the embedded control programs 620 in these embodiments monitor the operating status of one or more of the input/output devices 130, e.g. by using "dead man" timer status, error checking protocols, etc. to determine which input/output devices are operational. This information is communicated back to the server 195. Other applications files 175 are used to query which input/output devices 130 are installed or operational in a given kiosk. In this way, the server 195 can determine which other application files 175 to send to the kiosk to enable the installed or operational input/output devices 130 and not to enable (configure) the uninstalled or faulty devices. Therefore, kiosks containing any general combination of input/output devices 130 can be installed remote to the server and the server will provide the correct and operational application files to make the kiosk operational for any given application. The application files can also be used to acquire information from one of more of the input/output devices to determine how to operate the devices.

Figure 3:
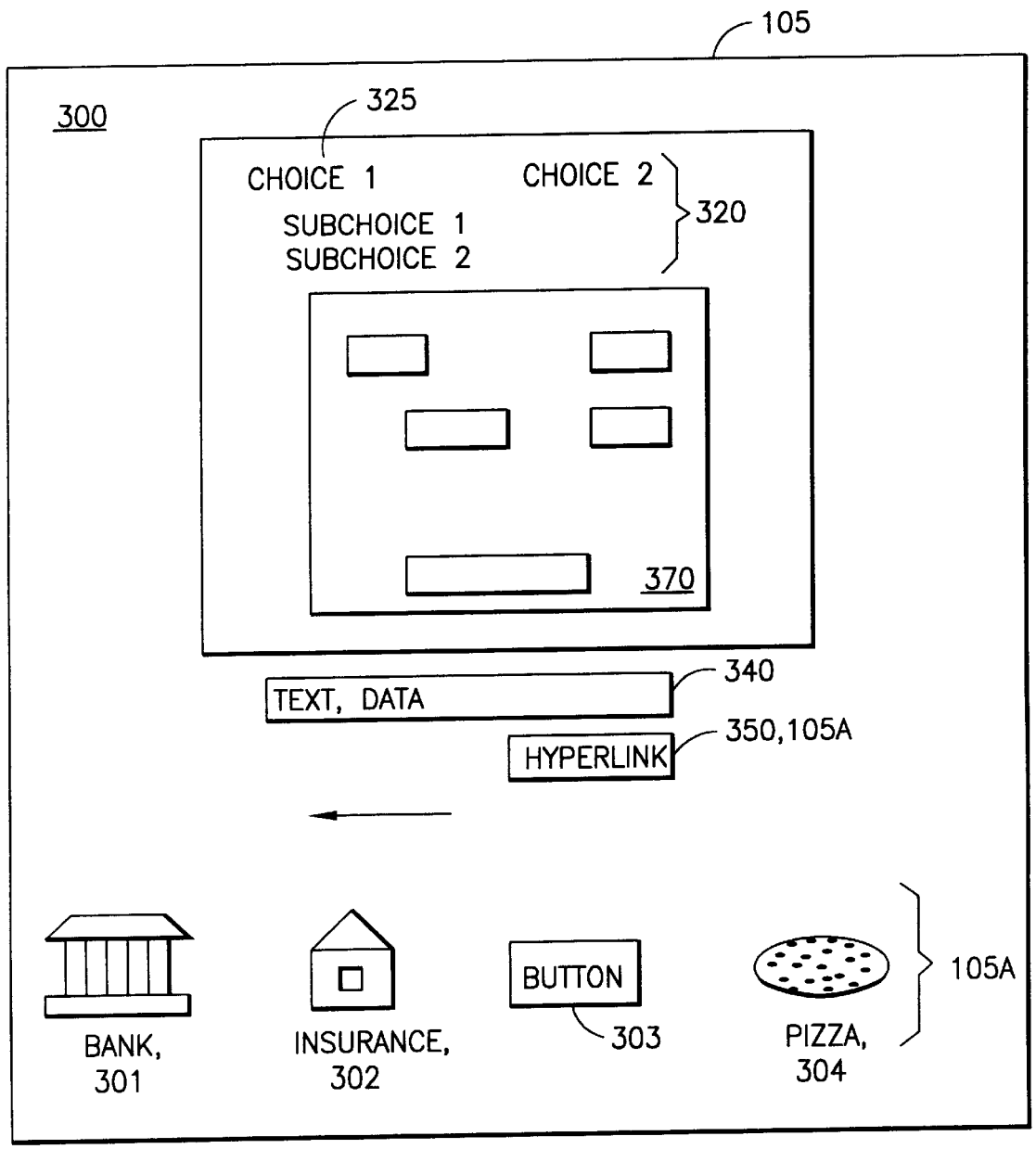
FIG. 3 is a block diagram of an example graphical user interface used in the kiosk.

FIG. 3 shows an example of a graphical user interface (GUI) 300 appearing on the screen/display 105 of the kiosk 100/200. The GUI 300 provides the main access interface to the user of the kiosk through selection function 105A. Examples of the selection functions 105A include icon images 301–304 indicating applications for a bank 301, an insurance service 302, a general soft button 303, and a pizza restaurant 304. The GUI 300 can also display selection functions 105A in the form of a menu 320 with one or more selections (typically 325). Other examples of selection functions 105A are hyperlinks 350 that can be part of the GUI 300 and/or menu 320. Other areas 340 of the GUI 300 can be used to enter information and/or other data. Using these information fields 340 the GUI 300 can be presented as a form 370 such as a tax form, loan application, mortgage application, deposit slip, etc. The GUI 300 can be displayed as a web page by the browser 160 using well known techniques. The web page can have multimedia (sound, video) aspects that are presented to the user through the other input/output devices 130.

Figure 4:
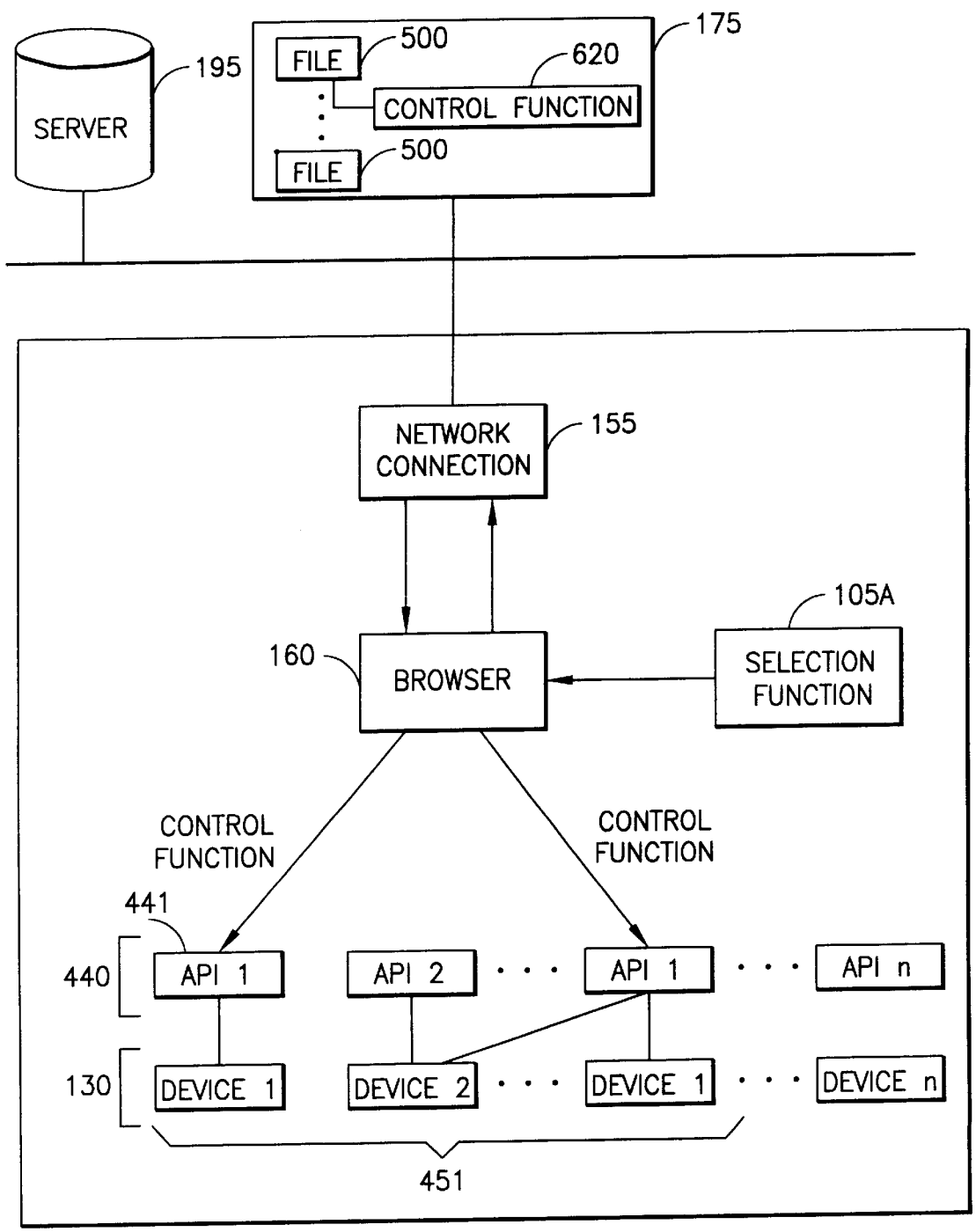
FIG. 4 is a block diagram showing a configuration set (application files) that are selected by a user and executed to configure the kiosk.

FIG. 4 illustrates the mechanism of how a user interacts through the user interface to select a selection function 105A which causes the corresponding configuration set 175 to be down loaded from the server 195 to the client (kiosk 100, 200) to conduct certain specific functions and control the specific subset 451 of peripheral devices 130 (e.g., 107, 109, 111, 113, 114, etc.). The peripheral devices 130 are controlled through their local APIs 440 (or a subset 441 of these local APIs 440). The local APIs 440 are software functional interfaces that directly control one or more peripheral devices 130. For example, local APIs 440 for a card reader 130 may include: initializing, starting, reading data from a card, ejecting a card, and turning off functions.

The selection (of the kiosk configuration) is done by a selection function 105A. Examples of the selection function 105A include:

a) a user explicitly touching an image icon on the screen or an other selection device like a button.

b) the currently executing program determining the need to invoke a selection based on the user's behavior e.g., invoking a help program if the user makes the same mistake more than 2 times in a row.

c) logic in the currently executing program determining the next selection (kiosk configuration). For instance, once the user completes the mortgage prequalification application and the bank approves it, the current application could ask the user if he needs realty information. If he answers yes, the kiosk configuration is changed to that of a realtor application.

In one embodiment, when a selection 105A is made, the browser 160 sends a request to the server 195 in HTTP via the network interface 155 for the first (file 500 of the) application file 175 corresponding to the selection function 105A. (See also FIG. 5 for a description of the files 500 in the application files/configuration set 175.) The server 195 then serves the application file 175 to the browser 160. After an application file 500 arrives at the browser 160, the HTML content of the file 500 is executed line by line. If the next application file 500 is associated with (e.g. hyperlinked) to the current application file 500 that the browser is executing, this next application file 500 is also sent to the browser. In this way, the browser 160 executes each file 500, line by line, and configuration set 175 by configuration set 175 in the sequence defined by order of the HTML text in the configuration set 175. By executing the files 500 in the application files/configuration set 175 in this manner, local APIs 440 (associated with device 130), or a subset of the local APIs 441, are invoked to control the subset of devices 451 that are selected and the kiosk (100, 200) is reconfigured. Note that logic in each of the application files/files (175, 500) and/or user actions can change which application files/files (175, 500) are executed and/or whether or not some of the application files are executed.

By executing the application files 175, the browser 160 selects and controls one or more of the devices 130. The configuration of the kiosk is defined by the devices selected 451 during the execution of the application files (e.g. the device subset 451) and how the device subset 451 is controlled. For example, in a banking configuration, the execution of the application files 175 calls a subset of APIs 441, e.g., selects and controls the card reader 111 and the printer 109 (the device subset 451) to respectively read a bank card and printout a transaction record. In the same banking configuration, the execution of one or more of the application files (and/or lines in the application files) 175 do not select or control a device 130 but cause other actions including: storing data, sending data or messages back to the server 195, etc. In an alternative configuration, ordering a pizza, the execution of the application files calls a different subset of APIs 441 to select and control the same device subset 451 (i.e. the card read 111 and printer 109) to respectively read and charge a credit card and printout a purchase receipt indicating the pizza toppings selected.

Note that in some configurations, execution of the application files 175 does not select one or more of the devices 130. In these cases, default devices are used. For example, a line in the file 500 that causes a line of text to be displayed will be directed by default to the the display 103.

Note also that the browser 160 can access a special set of local executable modules which use other local programs and/or libraries to interact with the execution of the application files. See FIG. 6.

Figure 5:
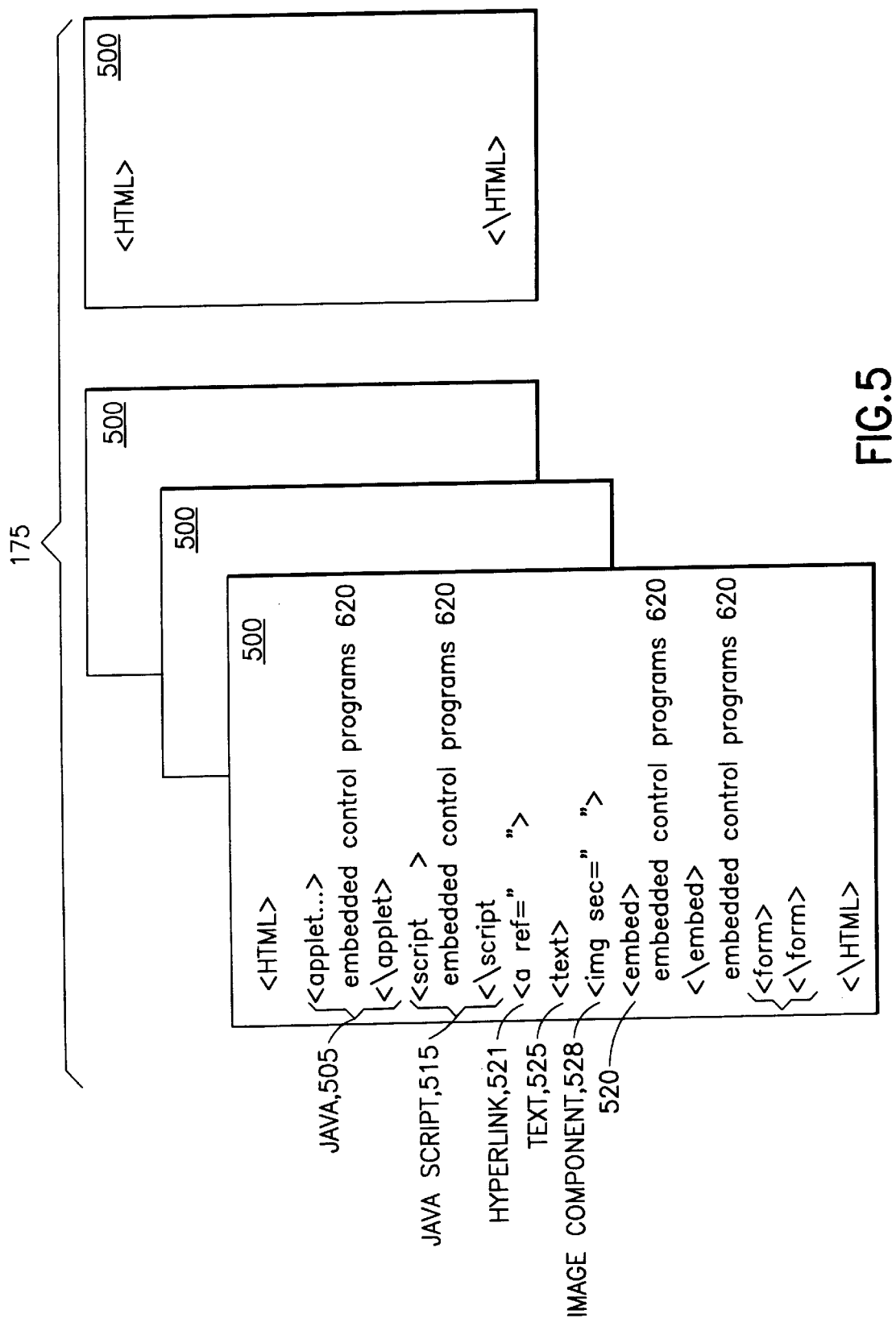
FIG. 5 is a block diagram of a set of application files (configuration set) that includes one or more HTML files and associated hypertext components including at least one embedded control program.

FIG. 5 is a block diagram of a set of application files (configuration set) 175 that includes one or more HTML files 500 and associated hypertext components including at least one embedded control program 620. All web-based application files 175 are HTML based files with at least one embedded control program 620. The application files 175 optionally include other hypertext components that may or may not be HTML based. Typically, an HTML file contains standard HTML (such as HTML 3.0) tags for: text 525, images or graphics 528, animation (embodied as images 528, applets 505, script 515, or other embedded components 520), sound (as one embedded component 520), video (as one embedded component 520) as well as other embedded programs 520. These tags are well known. In one preferred embodiment, the browser 160 is Netscape Navigator v3.0. The embedded programs can be implemented by using JavaScript, and/or a Java applet and/or any other embedded program which uses plug-ins. As shown in FIG. 5, the HTML file 500 uses tag 505 to embed a Java applet, tag 515 to embed JavaScript functions, and tag 520 to embed any other program which will invoke the plug-in functions of the browser. More information on standard HTML tags can be found in the "Netscape HTML 3.0 Source Book" which is herein incorporated by reference in its entirety. Some of these embedded programs 520 are embedded control functions/programs 620.

Figure 6:
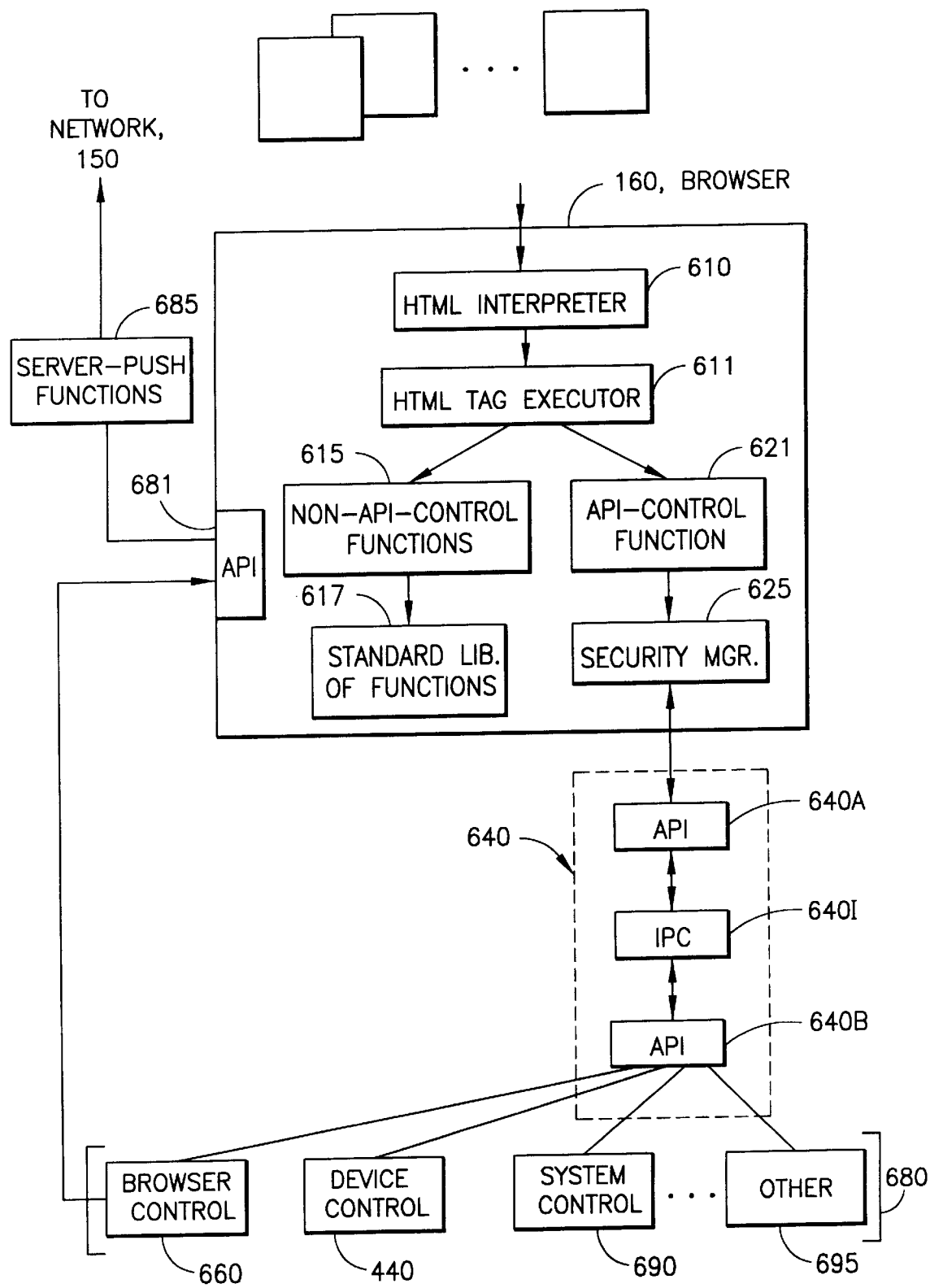
FIG. 6 is a block diagram showing one preferred embodiment of the kiosk executing the application files and the control programs/functions interacting with local API programs to configure the kiosk.

FIG. 6 is a block-diagram that shows the components of the system that are involved in executing embedded control programs 620 of a typical application configuring the kiosk 100.

In browsers 160, functionally there is an interpreter 610 that interprets or recognizes HTML tags in HTML files. The interpreter 610 will invoke an HTML tag executor 611 to execute functions for each of the HTML tags depending on type of tag and the content of the tag. If the execution does not invoke an API call 680 to local kiosk programs (include local peripheral APIs 440), the browser executes 615 each of the HTML tags using a library of standard functions 617 if necessary. Examples of these non-API-control functions 615 include: displaying text, displaying images, etc. These are well known and are present in prior art browsers.

However, if the executor 611 encounters an embedded control function 620 that calls one of the local kiosk APIs 680, the executor 611 invokes a security manager 625, internal to the browser 160, to determine if the API call is allowed. In this invention, a novel kiosk control mechanism 640, or part of this mechanism 640A, is placed in a subdirectory of a directory in which the browser is located. By doing this, the security manager 625 will find the control mechanism 640 (640A below) when the executor 611 encounters the embedded control function 620 and an API control function 621 will load the control mechanism 640/640A into the browser process 160. For example, these embedded control functions 620 include applets that call one or more local API functions 680/440 (i.e., the selected subset of APIs 441) to operate a given subset of devices 451. For example, if the device is a card reader, the embedded control function 620 may call the appropriate APIs 440 using the control mechanism 640 to open the card reader device, read data from a card, eject the card, and close the card reader device.

Note that known browsers 160 do not execute embedded control functions 620 from the network 150 to execute local APIs 680. In fact, these browsers specifically prevent execution of these API control function because of well known network security reasons. For example, if the application file 175 is changed while passing over the network, the execution of a damaged control function in the application file can cause unpredictable and detrimental results at the client machine, i.e., the kiosk (100, 200).

For example, it is well known that Java is designed to overcome the network security problems through using various special means such as byte-code transmission and verification, error checking by the virtual machine, etc. Furthermore, when Java is used as an applet in the web-based application, i.e., embedded in the HTML files, the browser usually strictly prevents the Java applet to access any local Java programs on the client machine except the ones in the standard Java library which are built in the browser. The reason for this is simply to prevent any possible damage that the applet could do to the client machine since the applet is from an uncontrolled environment, i.e., it could come from any server across the network.

As stated in the book "Java Now" (p4., by Kris Jamsa, Jamsa Press, 1996. ISBN 1-884133-30-4), "To address security issues, Java developers had to ensure a programmer could not develop a computer virus using a Java applet, and that an applet could not transfer information about a user's system (such as a file on the user's system) back to the server. You would hate, for example, to be browsing your competition's Web site while their Java applets browsed your hard disk. To provide such security, the Java developer choose to limit the operations an applet can preform. For example, a Java applet can not read or write files on the user's system. In this way, an applet cannot store a virus on a user's disk or read information stored on a user's disk." It is also stated that "Java lets programmers create stand alone programs. Java stand alone programs are similar to the programs that programmers can create using C++. Such stand alone programs can read and write files and perform operations that Java restricts applets from performing. A Java applet, on the other hand, only runs within a browser . . . ". This means that Java applets, as designed, do not operate functions outside of the browser process 160.

During operation of a standard browser, the browser's security manager 625 watches out for any violation of these security rules. If an applet is found to request an access to a program which is not within the standard Java library, the browser simply reports a security violation error and stops the execution of the applet.

In one embodiment of this invention, parts 640A of kiosk specific control mechanisms 640 are added to the browser 160 and other parts 640B of the kiosk specific control mechanism 640 are added to the application programming interfaces (APIs) 680 (including 440) in order to enable the application files 175 to configure the kiosk. Accordingly, the kiosk specific control mechanisms 640 are divided into two parts: a browser mechanism 640A and an API mechanism 640B. In this embodiment, the browser mechanism 640A and the API mechanism 640B communicate through an interprocess communication (IPC) 640I. The IPC 640I interface allows the browser mechanism 640A and the API mechanism 640B to communicate using message passing instead direct function calls. (IPCs are well known, one example would be the use of the Dynamic Data Exchange (DDE) in the Microsoft Window's operating system.)

The browser mechanism 640A is located in the browser subdirectory so that any API control function 620 in any of the application files 175 is recognized by the interpreter 610 and the browser 160. The API mechanism 640B receives messages from the browser mechanism 640A and independently controls various functions including the device APIs 440 according to the message. In this way, the applet from the browser is enabled to control one or more of the devices and local functions, but only those that have a browser mechanism 640A. Therefore, other functions in the kiosk still remain secure from access of the application files 175 over the network. Thus the kiosk is configurable, but secure. Further, since the API mechanism 640B operates the device API 440 independent of the browser, any device control function (a subset of the API control functions 620 that is used to control a given device) passed through to the API mechanism 640B will be performed on the subset of devices 451 even if the application file is later dropped or changed in the browser 160. This allows device operation to be conducted in a persistent way, i.e., once an API function (640,440) is initiated, the function can be completed whether or not the application file 175 is changed/dropped by the browser 160. This execution persistence also allows some user interactions with the kiosk to be more efficient. For example, an application file 175 can direct a card issuer to issue a new card. The user/browser then can move on to another application file while the card issuer device is writing data into the magnetic stripes and embossing the new card.

Figure 6A:
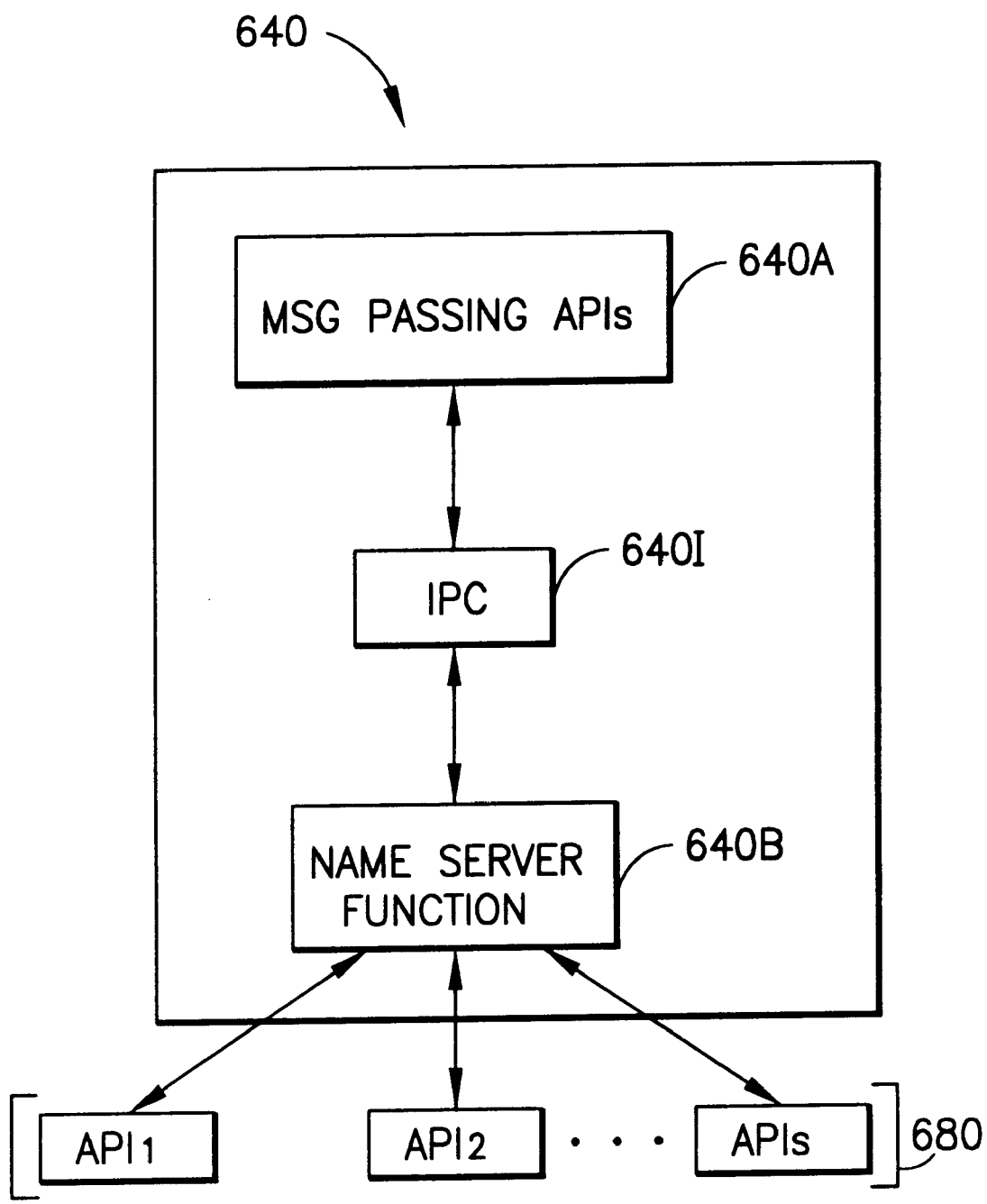
FIGS. 6A–6D are block diagrams showing various alternative preferred embodiments of kiosk control mechanisms.
Figure 6B:
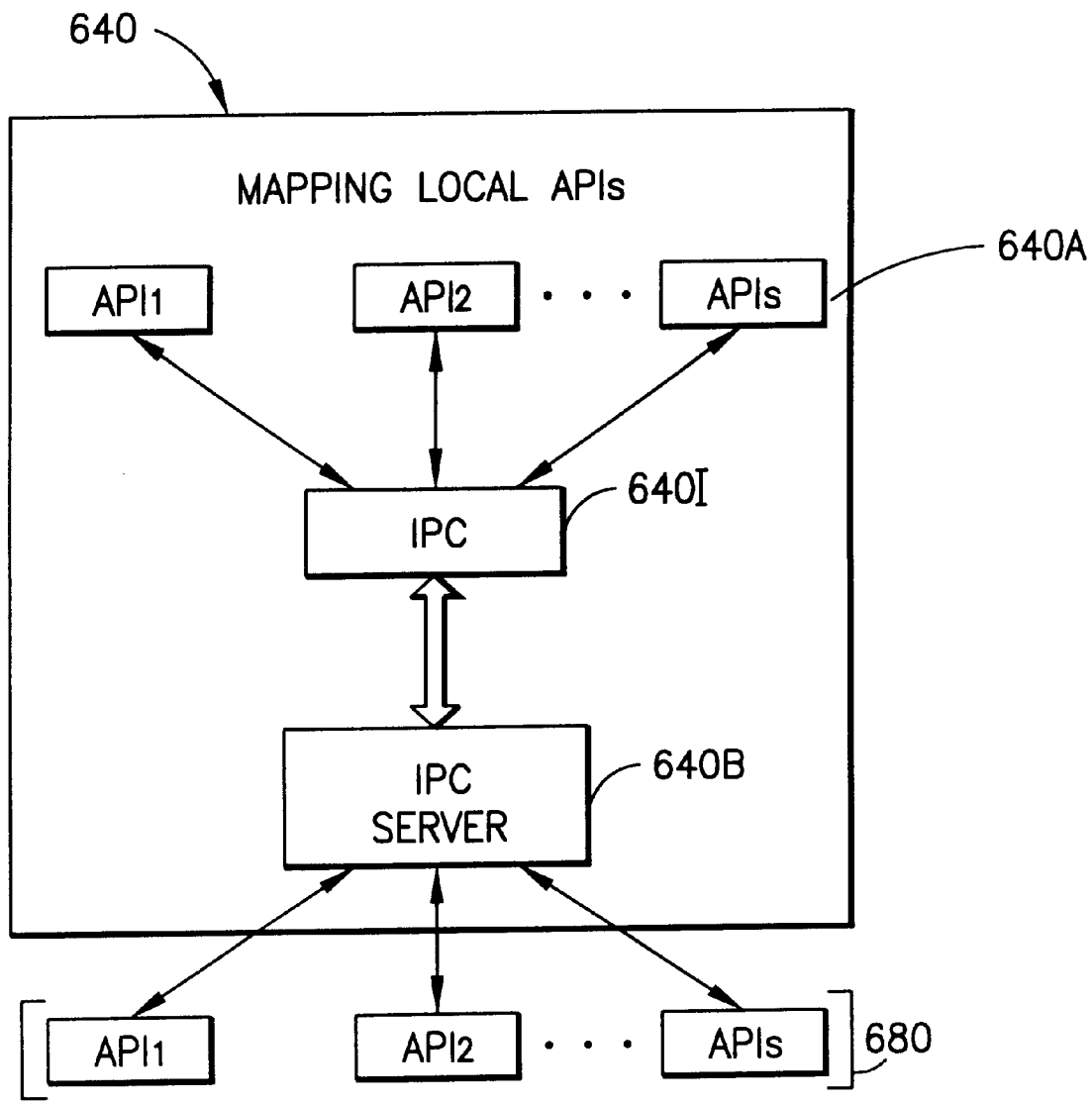
Figure 6D:
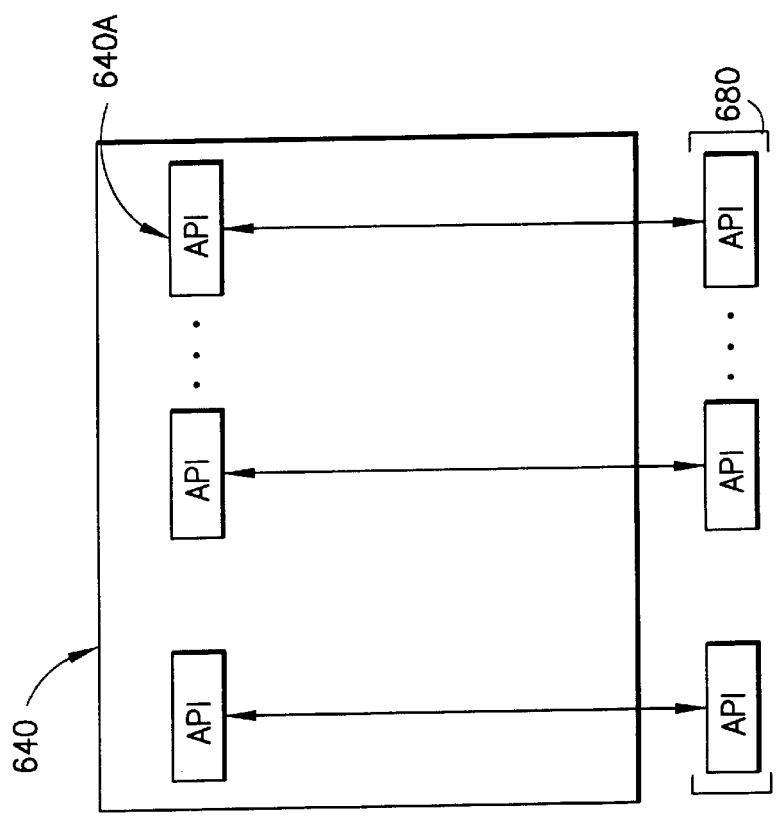

The browser mechanisms 640A are: 1. novelly located within the browser's own standard directory/library and 2. have a structure that enables an application file 175 to invoke one or more of the local APIs 680 by either: message passing using a name server mechanism which passes the messages (e.g. function name and related parameters) about one or more local API function (see FIGS. 6A and 6C and the explanation) or directly invoking the local API functions (see FIGS. 6B and 6D and explanation).

In one preferred embodiment, the browser mechanism 640A comprise a Java API (sometimes called a "Java wrapper") which is known to the application file 500 and further comprise functions programmed in a native language (e.g. C++) to do communication (e.g. using interprocess communication or name servers) or to directly call the local APIs 680.

The API mechanisms 640B: 1. directly access various local function modules (for example browser control modules, collaboration function modules, device control modules, and system monitoring modules, etc.); 2. have a structure that can invoke a set of one or more API functions 680 either using a name server mechanism or directly calling the related local function module; and 3. have an IPC that enables the message-based communication with API 640A. (Note that the API functions 680 are designed specifically to control any given device or function in the kiosk and may or may not be accessible by the application files 175.)

One application example of using this kiosk control mechanism is to inquire the system setup and status before the application decides how to configure the kiosk. In the application file 175, an applet CallAPI.class can be used to invoke the API function 640 "query_status". E.g.,

```
Public class CallAPI extend applet implement Runnable {
    ...
    a = new kioskAppInterface( );                   (640A)
    a.send_APImessage("query_status");              (640A)
    a.get_APImessage("status", sysStatus);          (640A)
    ...
}
``` and this applet is embedded in the HTML file as

```
<HTML> (175, 500)
...
<body>
...
<applet name="API" src="CallAPI.class"...>
</applet>
...
</body>
</HTML>.
```

When this applet is executed by the browser it first instantiates a class called kioskAppInterface. This file and related DLLs are novelly located in the browser standard library. Then it uses the method of the kioskAppInterface class (640A) called send_APImessage( ) to send an API message "query_status" (640A). This method invokes an interprocess communication function 640I to send the message to the API mechanism 640B. The API mechanism 640B then invokes the related local API function 680 to obtain the system status data and sends the data back to 640A through an inter—process communication function 640I. The applet uses the method get_APImessage( ) with the command "status" to get the data which is sent back from 640B and stores the data in a data structure inside a class called sysStatus.

The API message passing between 640A and 640B may use a name server function mechanism. (See FIG. 6B below.) In general, when a message is obtained by 640B, the name server function (in 640B) parses the message and calls corresponding local function APIs 680. In this example, it calls a system supervisor function API to get the system status data which can be illustrated in the following:

```
... if(Func_Name == "query_status")
{
    data = system_supervisor_get_status( ); (680, 690)
    send_message(data); (640I)
} else if (Func_Name == "read_card")
{
    ...
}
...
```

Here is an example of the data obtained in the "sysStatus" class data structure as mentioned above:

Num. of Device=5 laser printer=OK card reader=OK card issuer=no card supply
receipt printer=OK
ticket printer=OK This message states that they are five devices on the kiosk and all are working except the card issuer which needs cards.

According to the current status data of the kiosk, the application files 175 may select to use laser printer, receipt printer and the card reader (device subset 451) while avoiding use of the card issuer since, as indicated in the status data, the card issuer has no cards in its supply. Alternatively, the card can be produced by other means and mailed to the kiosk user.

In some preferred embodiments, techniques like this are used to determine which devices are provided on the kiosk and whether or not these devices are functioning properly. In this way, the server can provide specific application files 175 to configure the kiosk based on which devices the kiosk provides and/or which devices are operable. Therefore, any number of different kiosk designs and/or operational situations can be configured by appropriate choice of application files at the server for the respective application configuration. For instance, in a banking application, application files 175 (file 500) that include laser printer controls will be sent to kiosks with laser printers in order to print high quality bank statements whereas application files 175 (files 500) with receipt printers controls will be sent to those kiosk that only have (available and operational) receipt printers for the same task (bank statement.) In this way, a kiosk with malfunctioning laser printers or less expensive kiosks without laser printers can still be configured appropriately for the banking application.

In alternative embodiments, status information can be requested by one or more servers by sending requests on application files. This information can be used to determine which kiosk and/or devices on those kiosks needs servicing. For example, a service representative can be sent to add cards to the card issuer device.

In other embodiments, status information can be requested for use in service history of the kiosk and/or devices. In addition other marketing information can be obtained. For example, which configurations are most requested by which class of customers at a particular location.

For example, a kiosk can have a browser window (let's call it System Monitoring Application Window) running on background of any other application. This system monitoring application window may contain one or more HTML files which contain(s) one or more applets which communicate(s) to one or more servers. (The mechanism of a Java applet communication with a server is well known.) This system monitoring application window may start whenever the kiosk is powered on and stay on as long as the kiosk is in operation. In this way, one or more server can obtain the kiosk's system status information at any time through the communication with applet(s) and serve, for instance the kiosk, for the purposes as mentioned above.

The invention enables the following:

1) It is possible to build a "thin-client" kiosk. Since there is no application specific software needed to be pre-installed on the kiosk, the kiosk can be built and maintained cost effectively. Therefore, one application (application file 500) can be written on a server that can be used by a large number of "thin" kiosks on a network connected to the server. Using this invention, no application specific software has to be designed for any of the "thin" kiosks on the network. In fact, the network can be made of one or more standard (thus cheaper) "thin" kiosks with no application specific software at all. (For instance, a kiosk manufacturer can make one or more standard kiosks to be used for, and independent of, any application.) The application files 500 can be developed, upgraded and/or maintained at the server and be used to reconfigure one or more of the kiosks on the network, without changing any programming in those kiosks. This "thin-client" kiosk makes possible massive deployment of kiosks for the purpose of serving general public access at any time and anywhere, e.g. a "kiosk telephone" that can communicate over the internet and/or the telephone network.

2) It is possible that a large number and a wide variety of applications can be developed on the server and delivered through this kiosk because of the reconfigurability of the kiosk. Therefore, application providers can share any of the kiosks that are on the network. These applications can be provided on the kiosk at specific times and/or for specific situations, e.g. a user request or any given environmental conditions (an umbrella store advertising when it starts raining.).

3) It is possible to leverage the information-rich, media-rich, and technology-rich advantages of the Internet and the World Wide Web since this kiosk can be based on the Internet and Web open standard technology.

Here are some non limiting examples of how a user might use this kiosk 100:

1. A kiosk screen at idle time shows dynamically various images, video clip, sound, and graphics patterns and text. The content of the screen is all controlled from HTML file(s) and the HTML file(s) is updated based on either kiosk request or the server push. The service providers may pay different prices for the different kind of screen "real estate" and the time for showing them. In the morning and evening traffic hours, it may show mostly the headline news and financial market changes; while in lunch hours it may show many restaurant promotions, and on weekends it may show department stores'sale advertisements. The content is always inviting people passing by to touch the screen.

2. A user sees the screen and walks over and touches it. It immediately turns to the next screen showing arrays of image icons and text indicating category(ies) of application.

3. The user touches the pizza ordering icon which brings up screen(s) from which the user can select the kind of pizza. The screen would prompt the user for where and when to deliver the pizza, and the user can give the information through on screen touch keypad. The control program embedded 620 in the HTML would capture the data. The screen would then prompt the user to insert the credit card to authorize the charge. The control program would open the card read and capture the credit card information. The control program can then use the related kiosk API functions to invoke the communication function on the kiosk to access the credit card company (e.g., through the modem) as well as the pizza store (e.g., through sending a fax). After these functions are completed, the screen would confirm with the customer the information for the ordering. Other general retail transactions can be done in a similar manner.

4. The user could also touch a telephone icon to make a phone call. The telephone application HTML file will be shown on the screen with a phone keypad. After the user enters the number, the embedded control program will invoke the related API function 640A to initiate the phone call, which can be a conventional phone call through Public Service Telephone Network (PSTN), or through Integrated Service Data Network (ISDN), or through an Internet-based phone depending on the network connection (122, 123, 150) of the kiosk, the application files 500, and the user selection 105A. When the phone is connected, the user can either use a handset or a speaker phone equipped with the kiosk. See U.S. patent application Ser. No. 08/595,897 to Hortensius et al. entitled Multipoint Simultaneous Voice and Data Services Using a Media Splitter Gateway Architecture, filed on Feb. 6, 1996 which is herein incorporated by reference in its entirety.

In alternative preferred embodiments, the user may select a video phone call or even a video conferencing call with application sharing if the other end has the same facility. Then the control program embedded 620 in the HTML application will invoke related API functions 640A to initiate kiosk video conferencing function. The user may use the touch screen and electronic pen equipped on the kiosk to facilitate the conversation (cited in the "Internet Web Page Sharing" patent to Fin et al.)

5. The user may select a fax function. The screen will prompt the user to enter the fax number, enter the credit card and put the document to be faxed at certain devices (such as a document slot), and to touch the OK button on screen when ready. When the button is touched, the embedded control program 620 will invoke related device control API functions 640A on kiosk to operate the scanner, scan the document, return the document, and send out the document electronically through network, e.g. PSTN or Internet.

6. The user may select the email function. The screen will show the HTML application for email. The embedded control program 620 may invoke related API function 640A or directly communicate with the mail server and directory server through the browser to identify the user and to retrieve existing email messages or sending new messages.

7. The user may select 105A to transfer electronic file on media carriers, such as a floppy diskette. The screen may prompt the user to follow certain process, e.g., to insert the floppy into a slot. The embedded control program 620 will invoke related API functions 640A to read the diskette and read or write the file(s) the user selects and to transfer them according to the user's instruction, e.g., send to somebody's email address.

8. The user may select a service among a wide range of service providers (e.g., application owners on the server) such as lawyers, doctors, accountants, real estate agents, loan brokers, investment advisors, insurance agents, etc. The screen would show the corresponding application in HTML files delivering the requested services. (Based on a user selection, this service can be presented in any natural language, e.g., English, Spanish, Chinese, Japanese, French, Italian etc.)

9. Depending on the service providers' application, a real-time collaborative session can also be started with video, audio, shared screen and remote device control functions (see patent to Fin et al.) The embedded program would invoke related API functions 640 to handle video, audio and data communication.

10. The user may select to search for information. The screen would prompt the user on what information is needed and the embedded control program would capture the data and send the inquires depending on the type of information. The inquiries could be sent through Internet using known search engines, databases on application servers, as well as databases on other network servers.

11. The user can select customized application services. For example, once the user is identified (e.g., from information accessed on a magnetic or smart card), the application files will provide information and/or a kiosk configuration that is customized for the user.

12. The user can select configurations of the kiosk 100 not initially provided by the kiosk. By interacting with a first configuration of the kiosk, references to other application files 175 can reconfigure the kiosk in a second configuration. For example, the first configuration may provide a user input (icon or hyperlink) that accesses the application files 175 for the second configuration.

13. The users can be one or more students or trainees that have access to one or more kiosks connected to a network where the server provides "teaching" application files 175.

14. The users can select "electronic" products from the kiosk. For example, compact disc (CDs) having musical, video, computer software, and/or other multimedia information can be dispensed from an appropriate dispensing device. Alternatively, blank media (e.g. tape, diskettes, writable CDs, etc.) can be written to by appropriate kiosk devices to provide any "electronic" information that can be transferred over the network to the user in a tangible form. For example, the latest opera recording can be provided in this way on CD without transporting a CD "cut" at a factory to a store.

Further examples are now given showing some kiosk control mechanism 640 used to input information from and output information to kiosk devices. In a general input situation, the application file 500 may have an embedded applet 620 called CallAPI.class that is used to invoke the API function 640 "hardkey_input". E.g.,

```
Public class CallAPI extend applet implement Runnable {
...
a = new kioskAppInterface( );                    (640A)
while (InputData.lastchar != RETURN)
{
a.send_APImessage("hardkey_input");              (640A)
a.get_APImessage("input", InputData);            (640A)
(e.g. display the key input at appropriate position on screen)
}
...
while (InputData.lastchar != RETURN)
{
a.send_APImessage("softkey_input");              (640A)
a.get_APImessage("input", InputData);            (640A)
(e.g. display the key input at appropriate position on screen)
}
...
a.send_APImessage("LaserPrint", FileName);       (640A)
}
``` and this applet is enbedded in the HTML file as

```
<HTML> (500)
...
<body>
...
<applet name="API" src="CallAPI.class"...>
</applet>
...
</body>
</HTML>.
```

When this applet is executed by the browser it first instantiates a class called kioskAppInterface. This file and related DLLs are novelly located in the browser standard library. Then it uses the method of the kioskAppInterface class (640A) called send_APImessage( ) to send an API message "hardkey_input" (640A). This method invokes an interprocess communication function 640I to send the message to the API mechanism 640B. The API mechanism 640B then invokes related local API function 680 to capture the key input(s) from the hardware key, equipped with the kiosk and send them back to 640A through an interprocess communication function 640I. The applet uses the method get_APImessage( ) with the command "input" to get the data which is sent back from 640B and stores them in a data structure inside a class called InputData.

```
In the number server function in 640B,
    ...
    else if(Func_Name == "hardkey_input")
    {
        data = get_hardkey_input( ); (680, 690)
        send_message(data); (640I)
    }
    else if (Func_Name == "softkey_input")
    {
        data = get_softkey_input( ); (680, 690)
        send_message(data); (640I)
    }
    else if (Func_Name == "LaserPrint")
    {
        Laser_print(FileName); (680, 690)
    }
    ...
```

Note that if the application files 500 have embedded applets that invoke a "softkey" input, similar API messages will be passed between 640A and 640B and different API functions 680 will be used to "pop-up" a soft key pad window on the screen and capture the user input. The API functions 680 for these soft key inputs are well known.

In similar fashion, if the application files 500 have embedded applets that invoke printing a file on an output device, e.g. the Laser printer, the code above will direct the local API function 680, Laser_print(FileName), controlling the laser printer to print the file "FileName".

FIG. 6A shows one embodiment of the kiosk control mechanism 640 using an IPC 640I and a name server function 640B. In this case, a small, fixed set of general communication (mainly for message passing) API functions 640A is used by the application files (175, 500). These communication API functions communicate, or pass messages between 640A and 640B. The execution of the message is done by the name server function which is in 640B. The server function 640B also serves as the IPC 640I server. The name server function recognizes a variety of predefined messages. For example, in one embodiment, the set of communication API functions has two functions: send_message(message) and get_message(message). However, there are a plurality of "messages". The name server function in 640B has a list containing each of these predefined messages and each of the predefined messages is associated with a set of logic that may call the appropriate local API functions 680 in order to execute the respective predefined message.

In this embodiment, new devices and/or new functions performed by these devices can be added by providing a new predefined message(s) and the necessary logic to perform the new functions. In this way the application files (175, 500) can execute these new functions by merely using the new message identifier in the given communication API function. This typical involves only changes in an "ASCII" or "text" message identifier in the application file 500. There is no need to code and compile new embedded program(s) or modify the existing program(s) in order to use the new functions. Therefore, the application owner (hence the application files 175 on the server(s)) has little to do in order to execute the new functions because the kiosk provider has incorporated the necessary logic in the name server 640B.

FIG. 6B is a block diagram of an alternative embodiment of the kiosk control mechanism 640 using the IPC 640I with mapping local APIs in browser mechanism 640A. In this case, many or all kiosk control functions 620 are executed by directly calling the corresponding mapping local APIs in the browser mechanism 640A from the application file 500. Each mapping local API 640A communicates through the IPC 640I to the API mechanism 640B which in turn invokes the appropriate local API function 680. Here the mapping local APIs 640A are Java API programs. There is one Java API program that is specifically written for one or more of the local APIs 680. Contrary to the name server case, at least one of the Java API programs has to have logic to control one or more of the local APIs 680. These Java API programs 640 are predefined and known to the application file 500.

In this embodiment, new devices and/or new functions performed by these devices can be added by providing a new mapping local APIs (640A) in browser mechanisms 640A with their corresponding API mechanisms 640B. In this embodiment, the application files 500 need to execute each of these new functions in direct calls. Therefore, part or all of the logic for performing the new function has to be defined in the application files 500. For example, the application programmer, designing the application files 500 on the server, has to code this logic, e.g. by writing a new Java applet.

Figure 6C:
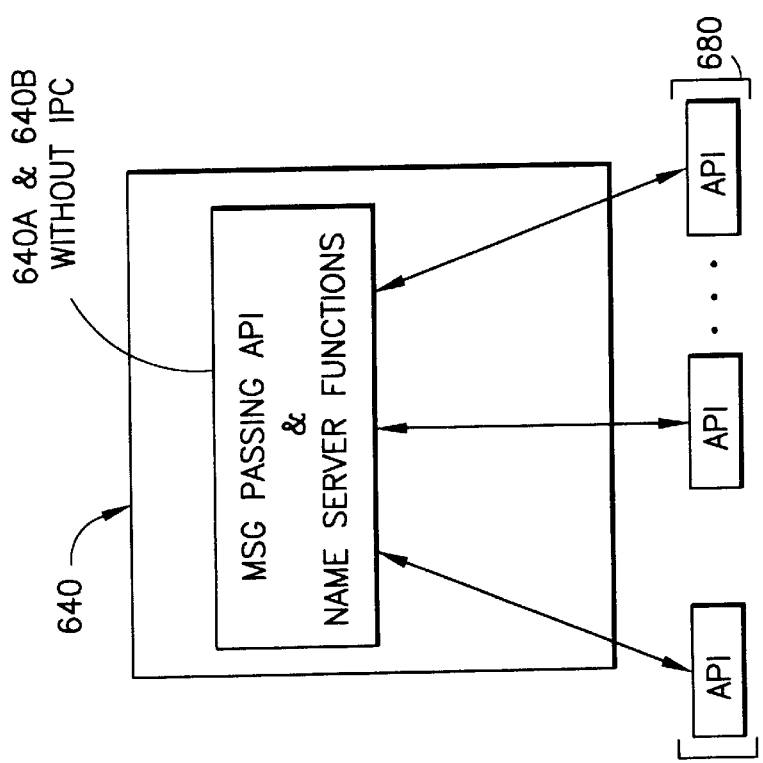

FIG. 6C shows an alternative embodiment of the kiosk control mechanism 640. In this embodiment, there is no IPC 640I and therefore, the API mechanism 640B merges into the browser mechanism 640A. However, the name server function (also merged) is still used and is combined with the set of communication APIs to become the browser mechanism (640B, 640). In this embodiment, the persistence of the invention is lost because once the application file 500 (containing the applet) is "dropped" (no longer executed) by the browser 160, the local function 680 terminates. This embodiment is useful where persistence is not required, e.g., where there is no kiosk device involved except for the screen controlled by the browser.

FIG. 6D shows an alternative embodiment of the kiosk control mechanism 640. In this embodiment, there is no IPC 640I and no API mechanism 640B at all. Here the applet directly invokes the API function (640, 640A) which directly calls the local API function 680. Here the API function 640 is a Java API program. There is one Java API program that is specifically written for one or more of each of the local APIs 680. Contrary to the name server case, at least one of the Java API programs has to have logic to control one or more of the local APIs 680. These Java API programs 640 are predefined and known to the application file 500. In this embodiment, the persistence of the invention is also lost.

FIG. 7 is a flow-chart of the execution process 700 performed by the kiosk.

The browser 160 first obtains 705 a (HTML) file 500, from the application files 175. The browser 160 then interprets 710 the tags and content of the application file 500. If the browser 160 does not 715 encounter a local API call, the browser conducts 720 related known actions to execute the tags. If the browser encounters a local API call 715, the browser will invoke 725 the related API function (640 or 640A).

In one preferred embodiment, the browser mechanism 640A communicates 730 messages with API mechanism 640B through interprocess communication function 640I. Alternatively, a message server is used as described above. The API mechanism 640B receives the message and invokes 735 related local functions 680. Then the API mechanism 640B communicates 740 messages with browser mechanism 640A through the interprocess function 640I on the results of execution of local functions.

The browser is controlled 750 to request for next HTML file either through the screen input, embedded control program logic, or external browser control functions 660. Using this invention, the browser can be treated as a local kiosk device. Therefore, the browser can be controlled to load any specific HTML file from one or more servers over the network by accessing known browser interfaces (APIs 681) using a local API 660. The local API 660 is designed (see above) to permit embedded control programs 620 to access the browser interfaces 681.

FIG. 8 is a flow chart of a server process 800 executing on one or more servers on the network. The server receives a request 810 over the network from one or more of the kiosks. The request identifies which of the application files 175 the kiosk is selecting/accessing. The request also has the location of the kiosk 100 requesting/accessing the application files. Upon receiving the request, the server sends 820 the requested application file(s) 175 to the kiosk. The application file(s) 175 can be either pre-made or dynamically generated by logic on the server.

In alternative embodiments, the kiosk sends the request 810 to a proxy server 195A. The proxy server 195A is typically located closer to the kiosk than the server 195. Alternatively, the proxy server 195A can be located on the computer 110 in the kiosk 100/200. For example, the server 195 can be located in a first city, e.g. a headquarters location, while the proxy server 195A is located on a LAN connected to the kiosk(s) at different city. The proxy server 195A can send the request to the server over a network 150 for many or all application files 175 that the kiosk may require according to a predefined schedule. In this way, the kiosk will have faster and more reliable access to the application files 175 on the proxy server 195A when the application files are needed. In addition, the proxy server may request the application files 175 from the server 195 during "off peak" times on the network.

In alternative embodiments, the server (195, 195A) can be used to "push" information to one or more kiosks identified by the server 195. For example, in step 810, the request is initiated at the server 195. This initiation 810 can be caused for various reasons. For instance, an application update may require that one or more of the kiosks be reconfigured with the new application files 175. Alternatively, there may be a new configuration required at a certain time each day, i.e., news from a different source is given a 5 PM each day. The server may also "push" a periodic "inspection" of the kiosks to determine which kiosks require maintenance.

One preferred implementation of this embodiment uses a "server push function" 685 operating at the kiosk. The server push function 685 is connected to the network 150 and is capable of receiving messages from the server 195. The server push function 685 also has access to the browser interfaces 681. The server 195 sends a request to the server push function 685 that causes the browser to request a specific application file 500 from the server 195.

Figure 9:
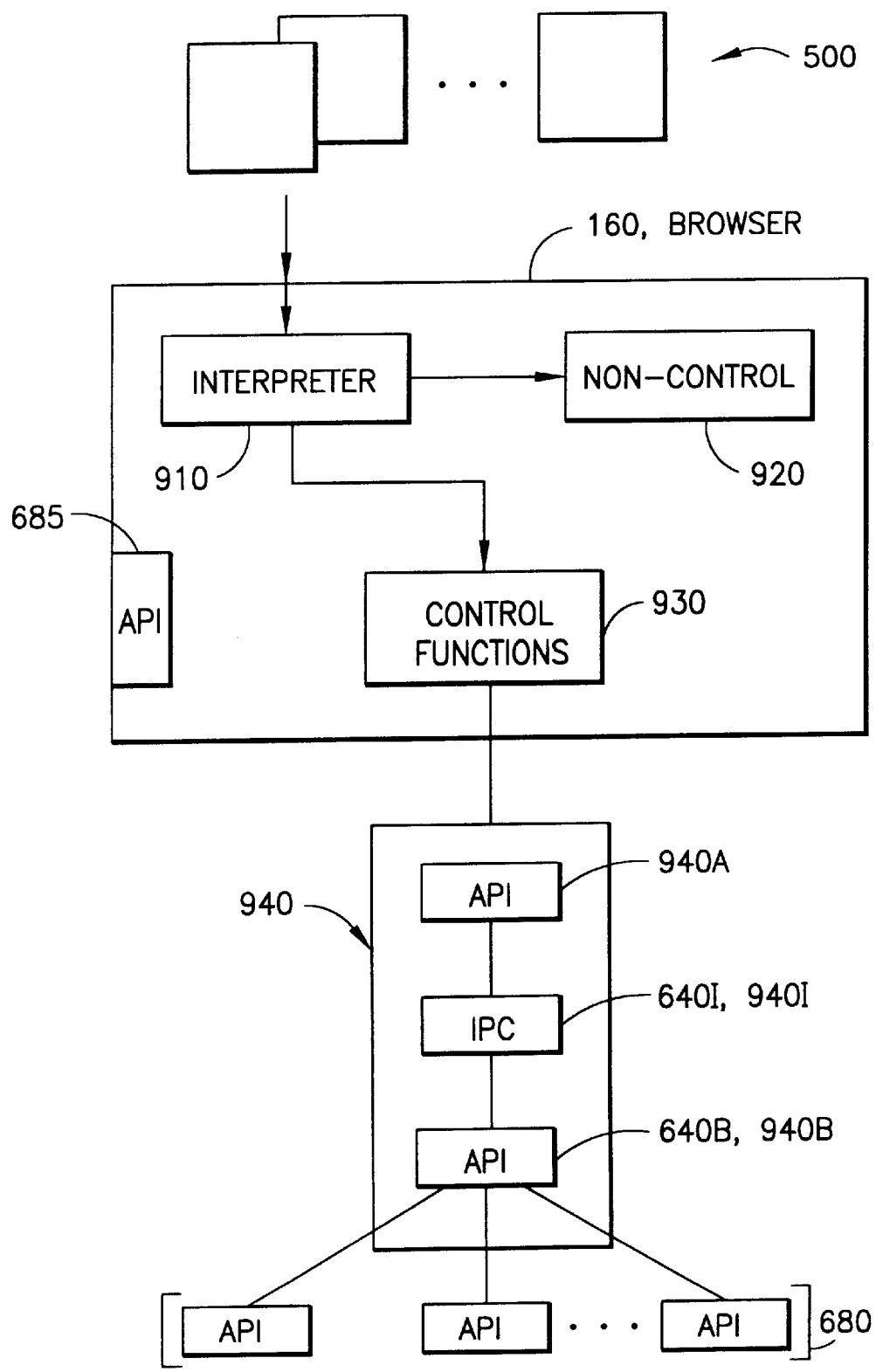
FIG. 9 is a block diagram of showing a preferred kiosk software architecture using ActiveX.

FIG. 9 is a block diagram showing the mechanism when the embedded control program is using ActiveX technology instead of Java. An ActiveX control object can be implemented using a variety of programming languages such as C++ or Visual Basic or Java. An ActiveX object can be embedded into an HTML file. For example,

```
<HTML>
...
<BODY>
...
<OBJECT
ID="MyObject"
CLASSID="CLSID:8E27C92B-1264-101C-8A2F-040224009C02>
<PARAM NAME="Version" VALUE=458752">
</OBJECT>
...
</BODY>
</HTML>
```

In this case, the browser must be ActiveX-enabled, i.e., supporting ActiveX technology. In one preferred embodiment, the browser is Microsoft Internet Explorer.

When the application file 500 arrives at the browser 160, the HTML file is interprets 910 based on its tags and contents. As in the Java case discussed above, the browser will execute 920 the non API control function as before. The API control functions executed 930 by the browser directly invoke APIs 940. Similar to the Java case, the first part of APIs 940A communicate through an Interprocess Communication function 940I (e.g. 640I) with the second part of APIs 940B (e.g. 640B) which in turn calls local API functions 680.

The difference between the ActiveX and previous Java case is that ActiveX can contain an object written in non-network language such as C++ or Visual Basic. The object in these languages is down loaded to the browser in the executable code. Therefore such an object can do anything that a local program written in the same language can, but it has no security limitation as Java applet has. So if the embedded control program 620 is written as an ActiveX control using the non-Java language, the API function 940 can be put anywhere in the kiosk. If Java is used in the ActiveX object, the previous discussed mechanisms have to still be used.

In FIGS. 9A–9D, boxes with numbers previously discussed have the functions as discussed above.

Figure 9B:
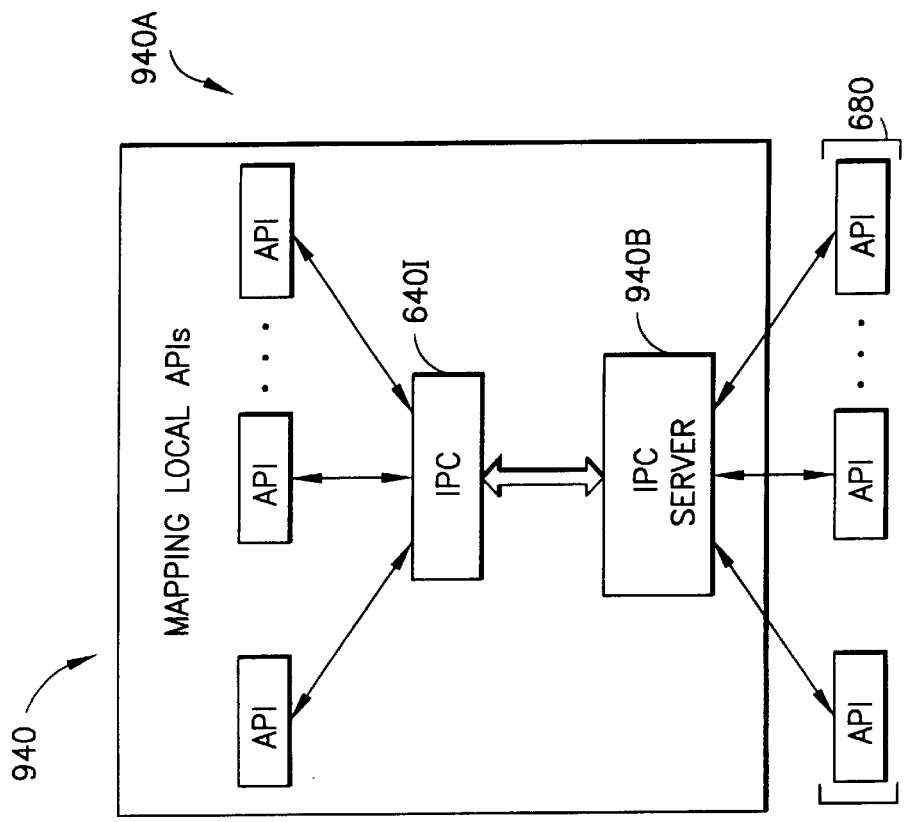
FIGS. 9A–9D are block diagrams showing various alternative preferred embodiments of kiosk control mechanisms using ActiveX.
Figure 9A:
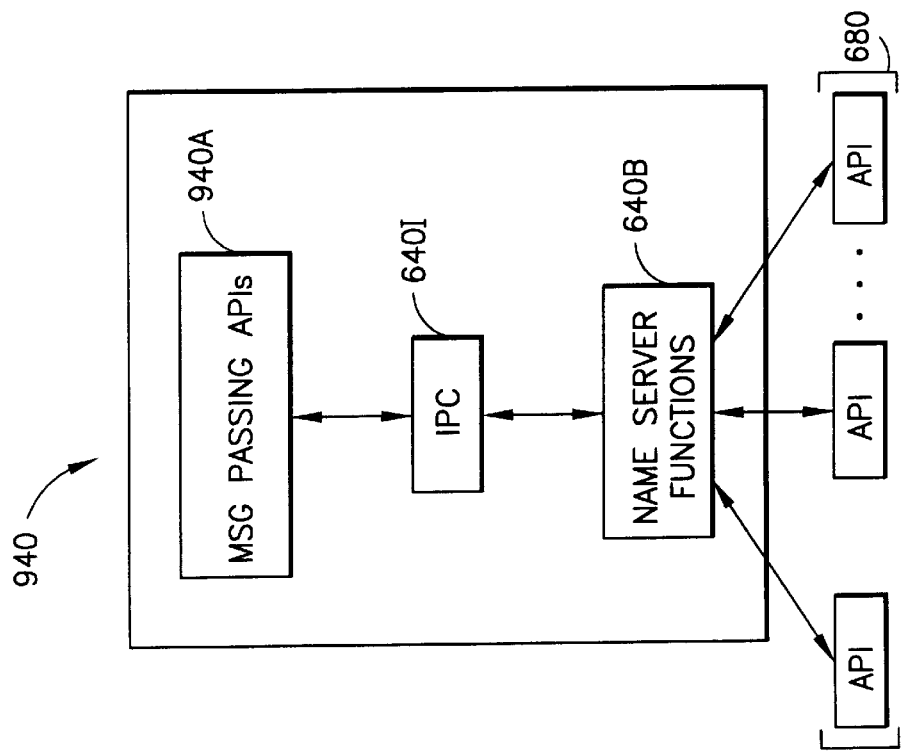

FIG. 9A show one embodiment of the kiosk control mechanism 940 using IPC and a name server function. Browser mechanism 940A is a native language API which does not have to be located in the browser directory but can be located anywhere in the memory of the kiosk, e.g., in the kiosk system directory. However, the path (i.e., the location) of the browser mechanism 940A has to be known to the application file 500.

FIG. 9B is a block diagram of an alternative embodiment of the kiosk control mechanism 940 using the IPC 640I with mapping local APIs. As in FIG. 6B, there is at least one browser mechanism 940 for one or more of the local APIs 680.

Figure 9D:
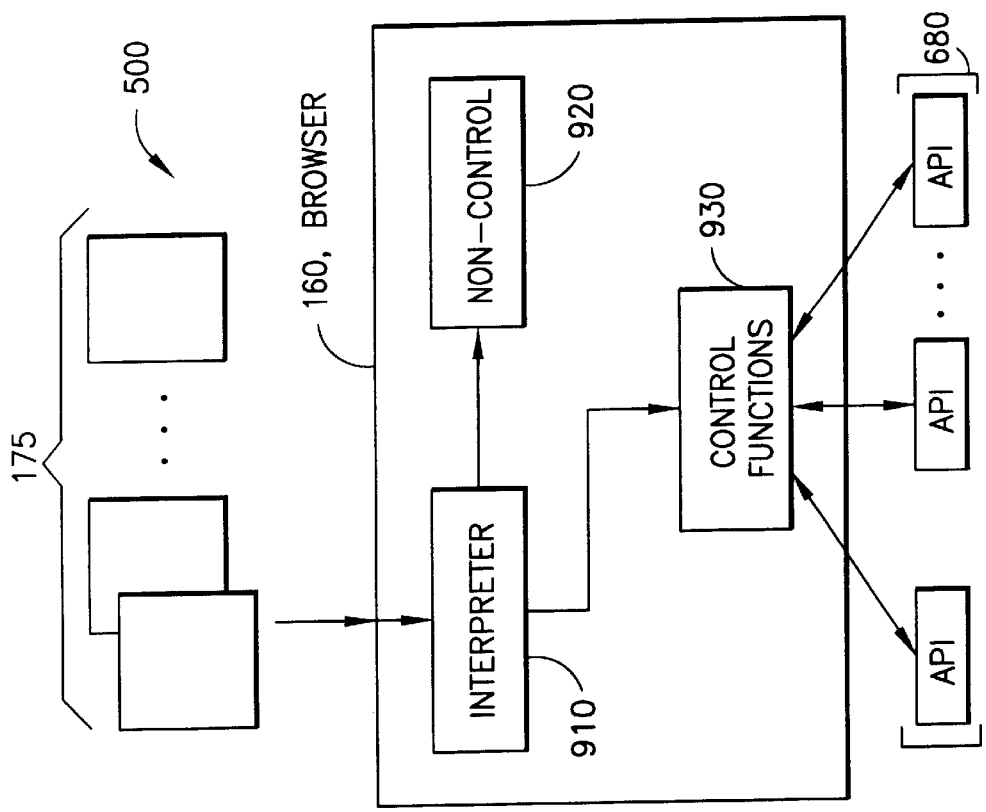
Figure 9C:
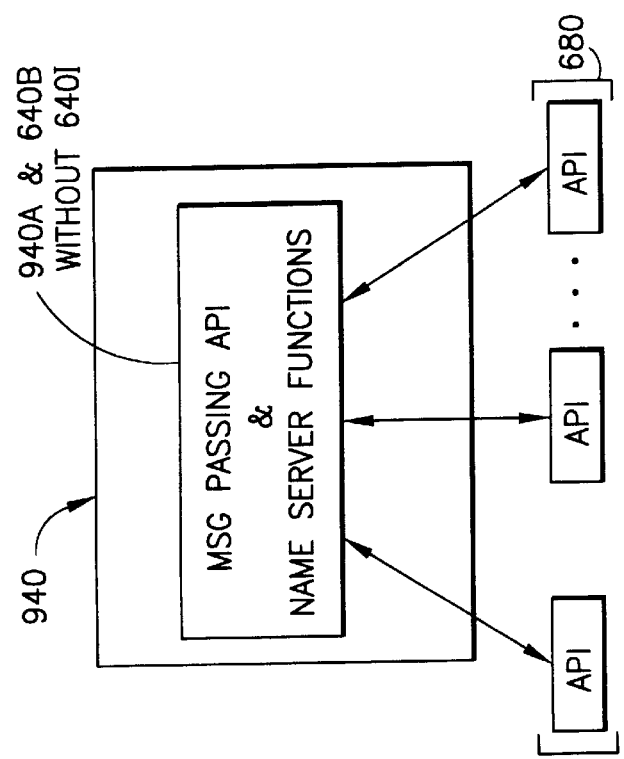

FIG. 9C shows an alternative embodiment of the kiosk control mechanism 940 with no IPC 640I. Here the browser mechanism 940A can be located as discussed in FIG. 9A.

FIG. 9D shows an alternative embodiment of the kiosk control mechanism using ActiveX control when the control is not implemented in Java. In this embodiment, there is no need for 940 at all since such embedded ActiveX control can directly call the local APIs 680. In this case, the persistence of execution is lost.

Figure 10:
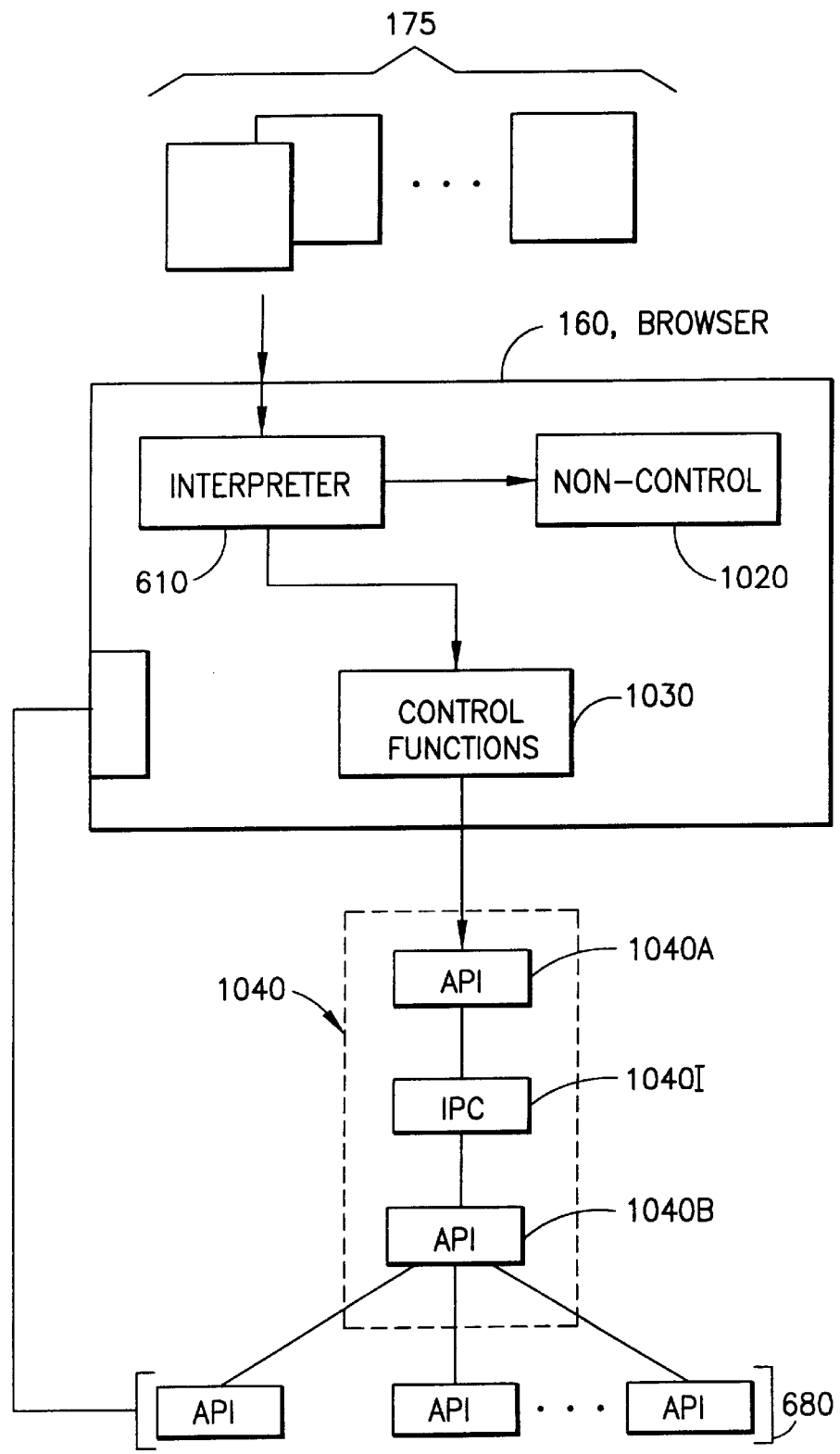
FIG. 10 is a block diagram of an alternative kiosk control embodiment using plug-ins.

FIG. 10 shows another alternative kiosk control mechanism using so-called plug-in techniques. In this case, the preferred embodiment uses a Netscape Navigator v3.0 or higher as browser 160.

Here a control mechanism 1040 comprises a browser mechanism (plug-in module and the associated Java wrapper) 1040A which is accessed by a kiosk control program (620) in the application file/file (175, 500). When accessed, the plug-in-module 1040A is executed as part of the browser 160. The executing plug-in-module 1040A in turn invokes an interprocess communication function 1040I. This interprocess communication function (IPC) 1040I can be the same as the IPCs (640I, 940I) described above. The IPC 1040I in turn communicates with the API mechanisms 1040B to invoke the local APIs 680. The API mechanisms 1040B can be the same as those (640B, 940B) described above.

In this embodiment, the browser mechanism 1040A is implemented by a plug-in technique (refer to "Programming Netscape Plug-ins" by Zan Oliphant, Sams.net Publishing, 1996 herein incorporated by reference in its entirety). The plug-in technique uses a native code module i.e., implemented using C or C++ or similar programming language, and in addition, in a more preferred embodiment, a Java wrapper. The plug-ins 1040A are located in a special plug-in directory specified by the browser 160. When the HTML interpreter 610 encounters the embedded file (620) that identifies the respective plug-in 1040A by a unique file name extension in the embedded file, also called Multipurpose Internet Mail Extension (MIME) type, the plug-in 1040A is dynamically loaded into the browser 160.

The embedded kiosk control program (620) can be a 1. JavaScript function, 2. a Java applet, and/or 3. a predefined set of control scripts contained in the (MIME) file with the unique extension.

When the browser 160 loads the plug-in module 1040A, the plug-in 1040A becomes available to the HTML document, i.e., functions in the plug-in (plug-in functions) are made available to the embedded programs (620), e.g. a JavaScript function or Java applet function to call. Doing this, the kiosk local APIs 680 can be controlled by any given embedded program(s) 620 through one or more corresponding plug-ins 1040A. In other words, the plug-in module 1040A will invoke IPC function 1040I to call the kiosk local APIs 680 through the corresponding API mechanism 1040B.

Three non limiting examples are now given.

Example 1 uses a JavaScript function as the embedded kiosk control program 1030 with a plug-in module 1040A providing a message passing function.

The application file 175 with the control program 1030 is as follows:

```
<HTML>
<HEAD>
etc.
<\HEAD>
<BODY> <APPLET NAME="MYAPPLET" SRC="MYAPPLET.CLASS"> etc.
<EMBED NAME="MYEMBED" SRC="MSGPASS.MET">
<SCRIPT LANGUAGE=JAVASCRIPT>
etc.
MYAPPLET.PluginAPI_SendMsg("CARDREADER_ON");
etc.
<\SCRIPT>
etc.
<\BODY>
<\HTML>
```

The Java applet "MYAPPLET.Java" would contain codes like:

```
import PluginWrapper
etc.
PluginAPI = new PluginWrapper( );
etc.
public PluginAPI_SendMsg(String msg) {
etc.
PluginAPI.SendMsg(msg);
etc.
}
```

The Java wrapper file, PluginWrapper.java, would contain the following code:

```
import netscape.plugin.Plugin;
etc.
public class PluginWrapper implements Plugin {
etc.
public native void SendMsg(String msg);
etc.
}
```

The plug-in module 1040A associated with the embedded control program 1030 above would provide the method SendMsg( ) which, for example, is implemented in native language code such as C++.

Example 2 uses a Java applet directly as the embedded kiosk control program 1030 with a plug-in module 1040A providing a message passing function.

The application file 175 with the control program 1030 is as follows:

```
<HTML>
<HEAD>
etc.
<\HEAD>
<BODY>
<EMBED NAME="MYEMBED" SRC="MSGPASS.MET">
<APPLET NAME="MY APPLET" SRC="MYAPPLET.CLASS">
etc.
<\BODY>
<\HTML>
```

The Java applet "MYAPPLET.Java" would contain code like:

```
import PluginWrapper
etc.
PluginAPI = new PluginWrapper( );
PluginAPI.SendMsg(msg);
etc.
}
The Java wrapper file, PluginWrapper.java, would contain the following code:
import netscape.plugin.Plugin;
etc.
public class PluginWrapper implements Plugin {
etc.
public native void SendMsg(String msg);
etc.
}
```

Same as in Example 1, the plug-in module 1040A associated with the embedded control program 1030 above would provide the method SendMsg( ) which, for example, is implemented in native language code such as C++.

Example 3 uses the embedded file 1030 containing a set of predefined control scripts and a corresponding plug-in module 1040A which interprets and executes the scripts to control of the kiosk local APIs 680.

The application file 175 with the embedded file 1030 could be as follows:

```
<HTML>
<HEAD>
etc,
<\HEAD>
<BODY>
<EMBED NAME="MYEMBED" SRC="MSGPASS.MET">
etc.
<\BODY>
<\HTML>
```

While the plug-in module 1040A may consist the following code:

```
NPError NP_LOADDS NPP_NEW (MPMIMEType pluginType,
NPP pInstance,
uint16 mode,
int16 argc,
char* argn,
char* argv,
NPSavedData* saved)
{
if (pInstance == NULL)
    return NPERR_INVALID_INSTANCE_ERROR;
KioskIPC* pKioskIPC = new KioskIPC (pInstance);
pInstance->pdata = pKioskIPC;
pKioskIPC->mode = mode;
return NPERR_NO_ERROR;
}
NPERROR NP_LOADDS NPP_Destroy (NPP pInstance,
NPSavedData* save)
{
KioskIPC* pKioskIPC = (KioskIPC *)pInstance->pdata;
if (pKioskIPC)
    {
    delete pKioskIPC;
    pInstance->pdata = NULL;
    }
return NPERR_NO_ERROR;
}
```

```
-continued void NP_LOADDS NPP_StreamAsFile (NPP pInstance,
MPStream* stream, const char* fname)
{
KioskIPC* pKioskIPC = (KioskIPC *)pInstance->pdata;
if (pKioskIPC)
pKioskIPC->InterpretFile(fname);
}
```

All the three plug-in functions shown above implement the standard plug-in APIs which are provided by the Netscape browser 160. Other plug-in APIs provided by the browser 160 are not used here.

When the <embed> tag is interpreted by the HTML interpreter 610, the file 1030, MSGPASS.MET, is downloaded to the local disk and the corresponding plug-in module 1040A is loaded, if it has not been loaded before yet, into the browser 160. The browser 160 will automatically call the plug-in API NPP_New( ) to create an plug-in instance and call plug-in API NPPStreamAsFile( ) with the name of the downloaded file to execute the file. When necessary, the browser 160 will call the plug-in API NPP_Destroy( ) to destroy the plug-in instance.

The class KioskIPC and function InterpretFile( ) can be implemented using a native language such as C++ to interpret and execute the predefined script in the embedded file. In this sense, there is no limitation on what the script can be as long as the function InterpretFile( ) is implemented such that it can parse the script and execute the necessary functions in reasonable performance. One example could be as follows:

In the embedded file, the script looks like

```
(beginning of MSGPASS.MET)
etc.
SendMessage: OpenCardReader
etc.
(end of MSGPASS.MET)
and the function InterpretFile( ) contains code like
(beginning of InterpretFile( ))
etc.
switch (Command){
etc.
```

```
case "SendMessage";
    SendMsg(Msg);
    break;
etc.
(end of InterpretFile( )).
```

The plug-in module 1040A can also create some buttons in the browser 160 window in order to realize certain interactive control of its functions. For example, it can create a button "Print" and wait for it to be touched or clicked in order to call the SendMsg( ) function to send message "PrintCurrentPage". The <embed> tag can also include a predefined set of parameters for controlling the plug-in module 1040A according the implementation of the plug-in module 1040A. For more information on how to use the <embed> tag and how to implement a plug-in module please refer to "HTML Publishing for Netscape" (by Stuart Harris and Gayle Kidder ISBN 1-56604-288-7) and "Programming Netscape Plug-Ins" (by Zan Oliphant ISBN 1-57521-098-3).

Given this disclosure alternative equivalent embodiments will become apparent to those skilled in the art. These embodiments are also within the contemplation of the inventors.

We claim:

1. A server comprising:
   one or more connections to a network, one or more requests received through the connections;
   one or more configuration sets having one or more files and at least one embedded control function sent by the server to one or more remote kiosks connected to the network, one or more of the configuration sets and one or more of the embedded control functions being associated with an application and capable of being executed by a browser on the remote kiosks, the embedded control function capable of invoking one or more browser application programming interface programs, the browser application programming interface programs capable of communicating between the embedded control function and a driver subset of local application programming interface programs associated with a respective subset of devices on the kiosk but external to the browser, and the embedded control function capable of selecting and causing the driver subset to control the subset of devices to configure the respective kiosk to perform the application.

2. A server, as in claim 1, where the request comes from one or more of the kiosks to be configured.

3. A server, as in claim 1, where the request comes from an agent computer.

4. A server, as in claim 1, where the configuration sets include any one of the following: a remote device control, a remote message display, a file transfer, and an agent/client collaboration.

5. A server, as in claim 1, where one or more of the embedded control functions are a system monitoring program for determining operating status of one or more of the local kiosk functions of one or more kiosks.

6. A server, as in claim 5, where the operating status is used to determine any one or more of the following: maintenance required for one or more of the peripheral devices, maintenance history for one or more of the peripheral devices, which application files to serve on the network to respond to one or more of the requests, and marketing information about one or more kiosk users.

7. A server, as in claim 5, where the operating status determines which configuration sets the server will serve on the network.

8. A server, as in claim 1, where the configuration sets comprise one or more HTML files having zero or more hypertext components.

9. A server, as in claim 1, where the application is a financial application.

10. A server, as in claim 9, where the financial application includes any one or more of the following: providing a user with financial information, opening an account, dispensing cash, paying bills, applying for loans, making deposits, applying for a mortgage, making a loan payment, making a mortgage payment, getting financial advice, trading one or more capital assets, and obtaining assistance from an agent.

11. A server, as in claim 1, where the application is a customized application that is customized to a user.

12. A server, as in claim 1, where the application program is an access to the internet through one or more kiosks that the configuration set configures.

13. A server, as in claim 12, where the access to the internet provides a communication link between one or more second users through one or more designated servers.

14. A server, as in claim 1, where the application is a communication application.

15. A server, as in claim 14, where the communication application includes any one or more of the following: a telephone call, an electronic mailing, a teleconference, a fax transmission, a training session, a search for information on the network, and a web based collaboration.

16. A server, as in claim 1, where the application is a service application.

17. A server, as in claim 16, where the service application includes providing any one or more of the following: an advertisement, a service, and a service charge.

18. A server, as in claim 1, where the application is providing information to a user using a kiosk configured by the configuration set.

19. A server, as in claim 1, where one or more of the embedded control functions is capable of causing one or more of the kiosks to request one or more of the configuration sets.

20. A server, as in claim 1, where the communication between the embedded control function and the driver subset of local application programming interface programs passes through the browser application programming interface programs and any one or more of the following: an interprocess communication program, a message passing program, a name server function, and an application programming interface program mechanism that communicates with the local application programming interface.

21. A method, performed by a server on a network, comprising the steps of:
   receiving a request from one or more kiosks connected to the network;
   sending, to the kiosk, one or more configuration sets having one or more files and at least one embedded control function, one or more of the configuration sets and one or more of the embedded control functions being associated with an application, the embedded control functions capable of selecting a driver subset of one or more local application programming interface programs, the driver subset being external to a browser on the kiosk and associated with a subset of devices on the kiosks and the embedded control function further communicating through one or more browser application programming interface programs with the driver subset to cause the local application program interface programs to reconfigure a control of the subset of devices to configure the respective kiosk to perform the application.

22. A server comprising:

one or more connections to a network, one or more requests received through the connections;

one or more configuration sets having one or more files and at least one embedded control function, one or more of the configuration sets and one or more of the embedded control functions being associated with an application, the embedded control functions capable of selecting a driver subset of one or more application program interface programs, the driver subset associated with a subset of devices on one or more local kiosks and a communication between the application and the driver subset caused by the embedded control function to cause the application program interface programs to reconfigure a non content based control of the subset of devices to configure the respective local kiosk to perform the application.

23. A server comprising:

one or more connections to a network, one or more requests received through the connections;

one or more configuration sets having one or more files and at least one embedded control function, one or more of the configuration sets and one or more of the embedded control functions being associated with an application, the embedded control functions capable of selecting a driver subset of one or more application program interface programs, the driver subset associated with a subset of devices on one or more local kiosks and the embedded control function further causing a communication between the application and the driver subset to cause the application program interface programs to reconfigure a control of the subset of devices to configure the respective local kiosk to perform the application, where the device subset and the application are different than a previous device subset associated with a previous application.

* * * * *